(12) United States Patent
Yoshihara et al.

(10) Patent No.: US 12,454,541 B2
(45) Date of Patent: Oct. 28, 2025

(54) REAGENT FOR MEASURING OXYGEN CONCENTRATION IN CELL AND TISSUE

(71) Applicant: NATIONAL UNIVERSITY CORPORATION GUNMA UNIVERSITY, Gunma (JP)

(72) Inventors: Toshitada Yoshihara, Gunma (JP); Tatsuya Hirose, Gunma (JP); Seiji Tobita, Gunma (JP)

(73) Assignee: NATIONAL UNIVERSITY CORPORATION GUNMA UNIVERSITY, Gunma (JP)

( * ) Notice: Subject to any disclaimer, the term of this patent is extended or adjusted under 35 U.S.C. 154(b) by 845 days.

(21) Appl. No.: 17/638,424

(22) PCT Filed: Aug. 25, 2020

(86) PCT No.: PCT/JP2020/032028
§ 371 (c)(1),
(2) Date: Feb. 25, 2022

(87) PCT Pub. No.: WO2021/039789
PCT Pub. Date: Mar. 4, 2021

(65) Prior Publication Data
US 2022/0306665 A1   Sep. 29, 2022

(30) Foreign Application Priority Data
Aug. 26, 2019   (JP) ................................ 2019-153754

(51) Int. Cl.
*C07F 15/00* (2006.01)
*A61K 49/00* (2006.01)
*G01N 21/64* (2006.01)

(52) U.S. Cl.
CPC ...... *C07F 15/0033* (2013.01); *A61K 49/0015* (2013.01); *G01N 21/64* (2013.01)

(58) Field of Classification Search
CPC . A61K 49/00; A61K 49/0015; C07F 15/0033; G01N 21/64; G01N 31/225; G01N 33/4833; C09K 11/06
See application file for complete search history.

(56) References Cited

FOREIGN PATENT DOCUMENTS

| CN | 106478731 | 3/2017 |
|---|---|---|
| JP | 4930943 | 5/2012 |
| JP | 5353509 | 11/2013 |
| JP | 2015-101567 | 6/2015 |

OTHER PUBLICATIONS

Takizawa et al, Inorganic Chemistry, vol. 55, pp. 8723-8735 (Year: 2016).*
Zhang et al, Cancer Research, vol. 70, No. 11, pp. 4490-4498. (Year: 2010).*
International Search Report issued Oct. 13, 2020 in International (PCT) Application No. PCT/JP2020/032028.
Esipova et al., "Two New "Protected" Oxyphors for Biological Oximetry: Properties and Application in Tumor Imaging", Anal. Chem., 2011, vol. 83, pp. 8756-8765.
(Continued)

*Primary Examiner* — D. L. Jones
(74) *Attorney, Agent, or Firm* — Wenderoth, Lind & Ponack, L.L.P.

(57) ABSTRACT

The present invention aims to develop a compound and a reagent having long phosphorescence lifetimes, for use in imaging of a hypoxic cell/tissue or for use in measurement/quantification of the oxygen concentration thereof. The present invention provides a reagent for measuring oxygen concentration, comprising a compound represented by the following General Formula (I) or (II).

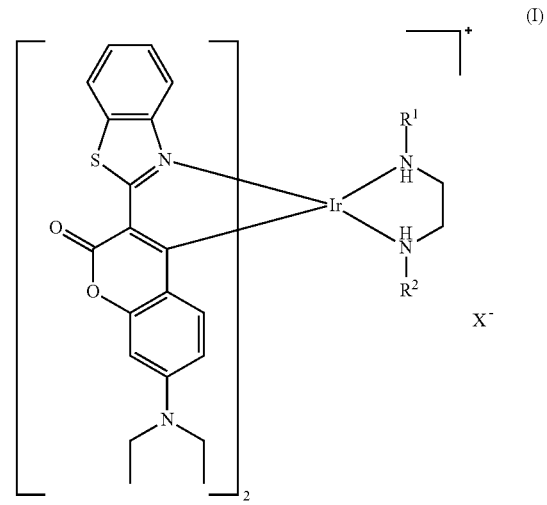

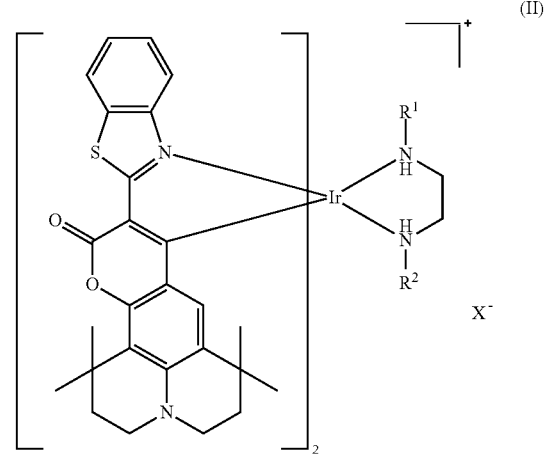

wherein $R^1$ and $R^2$ each independently represent hydrogen or a $C_1$-$C_6$ hydrocarbon group; and $X^-$ represents a counter anion.

10 Claims, 10 Drawing Sheets

(56) References Cited

OTHER PUBLICATIONS

Zhang et al., "Phosphorescent Light-Emitting Iridium Complexes Serve as a Hypoxia-Sensing Probe for Tumor Imaging in Living Animals", Cancer Res., vol. 70, No. 11, Jun. 1, 2010, pp. 4490-4498.

Yoshihara et al., "Intracellular and in vivo Oxygen Sensing Using Phosphorescent Ir(III) Complexes with a Modified Acetylacetonato Ligand", Analytical Chemistry, 2015, vol. 87, pp. 2710-2717.

Fercher et al., "Intracellular $O_2$ Sensing Probe Based on Cell-Penetrating Phosphorescent Nanoparticles", ACS Nano, 2011, vol. 5, No. 7, pp. 5499-5508.

Takizawa et al., "Impact of Substituents on Excited-State and Photosensitizing Properties in Cationic Iridium(III) Complexes with Ligands of Coumarin 6", Inorganic Chemistry, 2016, vol. 55, pp. 8723-8735.

Hirose et al., "Development of Ir(III) complexes based on coumarin derivatives as ligands and their application to in vivo oxygen imaging", Abstracts of Annual Meeting on Photochemistry (CD-ROM), Sep. 10, 2019, 3P103, with Partial English Translation.

\* cited by examiner

Phosphorescence intensity image

Phosphorescence lifetime image 5.0     $\tau_p$ / μs     7.0

REAGENT FOR MEASURING OXYGEN CONCENTRATION IN CELL AND TISSUE

TECHNICAL FIELD

The present invention relates to a reagent for measuring oxygen concentration in a cell and tissue

BACKGROUND ART

Hypoxic environment in vivo is found commonly among cancer, cerebral apoplexy, and myocardial infarction, which are the three commonest causes of death in Japan, and the like. Thus, development of a non-invasive method for real-time measurement of oxygen concentration in cells and tissues is an important task in the fields of cell biology and medicine. Known methods of quantification of the oxygen concentration in a biological tissue include: (1) a method in which a microelectrode is inserted into the tissue to measure the oxygen concentration; (2) a method using the ESR signal of a paramagnetic probe molecule; (3) a method using reduction reaction of a nitroimidazole-based probe molecule; and (4) a method using luminescence of a water-soluble porphyrin or a ruthenium complex. The method (1) using a microelectrode only allows measurement of the oxygen partial pressure at a position near the electrode. Moreover, the method has a drawback in that it is invasive. The method (2) based on the ESR signal is incapable of real-time measurement of the oxygen concentration. The method (3) using a nitroimidazole-based agent is based on that nitroimidazole in a hypoxic cell is reduced to be bound to, and trapped on, intracellular protein. This method has a drawback in that, since the metabolism of the agent requires a long time, data can only be obtained several hours after the administration of the agent. The method (4) is a method in which the oxygen concentration is measured based on the fact that the phosphorescence lifetimes of water-soluble porphyrin derivatives and ruthenium complexes change (due to quenching) depending on the blood oxygen level. This method has a great advantage that the oxygen partial pressure in a tissue can be non-invasively visualized, but, since the reagent is water-soluble, the data that can be obtained are limited to blood oxygen levels (Non-patent Document 1).

The present inventors developed a method of measuring the oxygen concentration in a biological tissue using room-temperature phosphorescence (the intensity and the lifetime) of an iridium complex (BTP, FIG. 11) (Patent Document 1). By measurement of the intensity and the lifetime of BTP phosphorescence, the inventors succeeded in quantification of the oxygen concentration in the liposome membrane, phosphorescence imaging using a cancer cell, and visualization of a tumor in a tumor-bearing mouse (Non-patent Documents 2 and 3). Further, the inventors developed BTPHSA (FIG. 11), an iridium complex that exhibits phosphorescence in the near-infrared region (Non-patent Document 2 and Patent Document 2), and succeeded in visualization of a tumor located about 6 to 7 mm distant from the skin (Non-patent Document 2). However, since BTPHSA has a phosphorescence lifetime of as short as 2.0 µs, and has low oxygen responsiveness, it is difficult with BTPHSA to distinguish between normal tissues and hypoxic tissues. In order to solve this, the present inventors synthesized PPZ4DMMD and PPZ3DMMD, which are iridium complexes comprising mesityl dipyrrinato (MD) and a phenylpyrazole (PPZ) (FIG. 11) as ligands (Patent Document 3). Since these compounds exhibit phosphorescence at 679 nm, and have a phosphorescence lifetime of 18 µs, they exhibit higher oxygen responsiveness than BTPHSA. However, the phosphorescence lifetime has not reached the phosphorescence lifetime required for measurement of the intracellular oxygen concentration using a commercially available microplate reader.

On the other hand, a reagent (MitoXpress Intra) for measurement of the intracellular oxygen concentration, wherein a platinum porphyrin complex having low cellular uptake capacity is incorporated in nanoparticles, and wherein the measurement is carried out using a microplate reader, is commercially available from Agilent (Non-patent Document 4). However, in order to obtain a signal from MitoXpress Intra, not less than 14 hours of culture is necessary. Further, since 380-nm ultraviolet light is required for the photoexcitation, the cells may be adversely affected. Moreover, there is no example in which the reagent was used for a live animal.

Non-patent Document 5 describes a compound corresponding to C6-MEDA. However, it has not been applied to measurement of the oxygen concentration.

PRIOR ART DOCUMENTS

Patent Documents

[Patent Document 1] JP 4930943 B
[Patent Document 2] JP 5353509 B
[Patent Document 3] JP 2015-101567 A

Non-Patent Documents

[Non-patent Document 1] T. V. Esipova et al., Anal. Chem., 83, 8756-8765, 2011.
[Non-patent Document 2] S. Zhang et al., Cancer Res., 70, 4490-4498, 2010.
[Non-patent Document 3] T. Yoshihara et al., Anal. Chem., 87, 2710-2717, 2015.
[Non-patent Document 4] A. Fercher et al., ACS Nano, 5, 5499-5508, 2011.
[Non-patent Document 5] Inorg. Chem. 2016, 55, 17, 8723-8735

SUMMARY OF THE INVENTION

Problems to be Solved by the Invention

As described above, a reagent for measuring oxygen concentration, which reagent has a longer phosphorescence lifetime, has been demanded. Further a reagent for measuring oxygen concentration, which reagent can be more safely and simply used, has been demanded.

In view of this, an object of the present invention is to develop a compound and a reagent having long phosphorescence lifetimes, for imaging of a hypoxic cell/tissue or for measurement/quantification of the oxygen concentration thereof.

Means for Solving the Problems

As a result of intensive study to solve the above problems, the present inventors developed an iridium complex comprising coumarin 6 or coumarin 545T as an aromatic ligand, and dialkylethylenediamine as an ancillary ligand. The iridium complex has a phosphorescence lifetime of not less than 30 µs in the red region. The present inventors discovered that use of the iridium complex enables imaging of a hypoxic cell/tissue and measurement/quantification of the oxygen concentration thereof, thereby completed the present invention.

More specifically, the present invention can be summarized as follows.

[1] A reagent for measuring oxygen concentration, comprising a compound represented by the following General Formula (I) or (II):

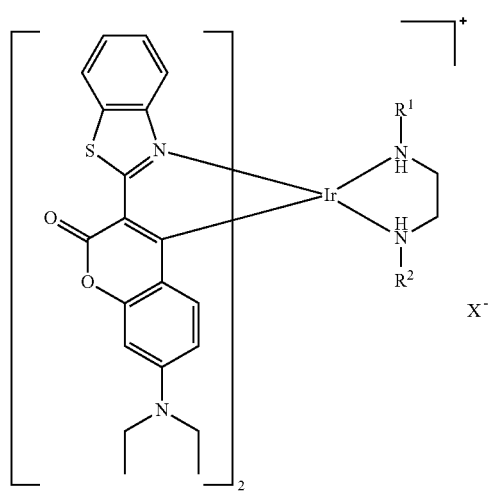

(I)

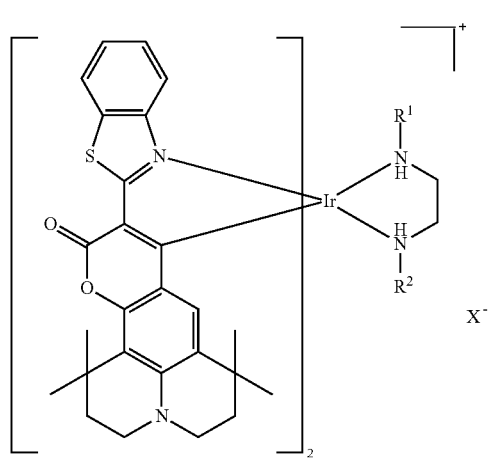

(II)

(wherein
R$^1$ and R$^2$ each independently represent hydrogen or a C$_1$-C$_6$ hydrocarbon group; and
X$^-$ represents a counter anion).

[2] The reagent for measuring oxygen concentration according to [1], wherein R$^1$ is the same as R$^2$ in each formula.

[3] The reagent for measuring oxygen concentration according to [1] or [2], wherein X$^-$ is PF$_6^-$ or Cl$^-$.

[4] The reagent for measuring oxygen concentration according to any one of [1] to [3], wherein the compound is any of the following compounds:

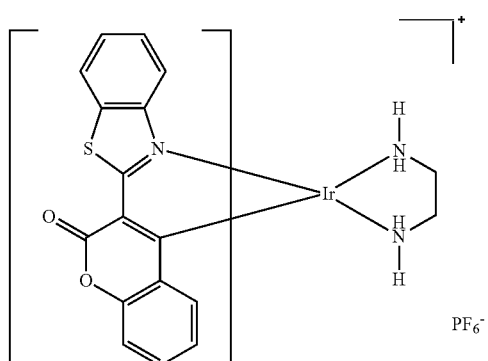

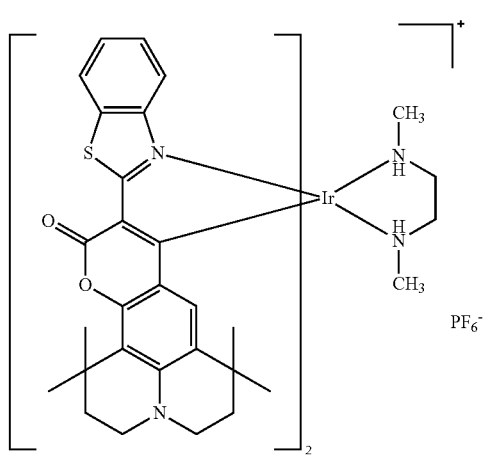

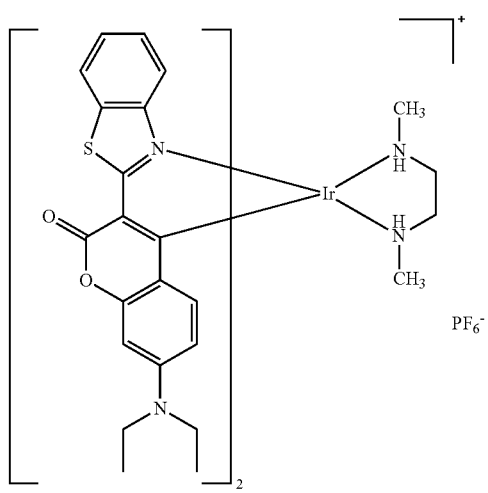

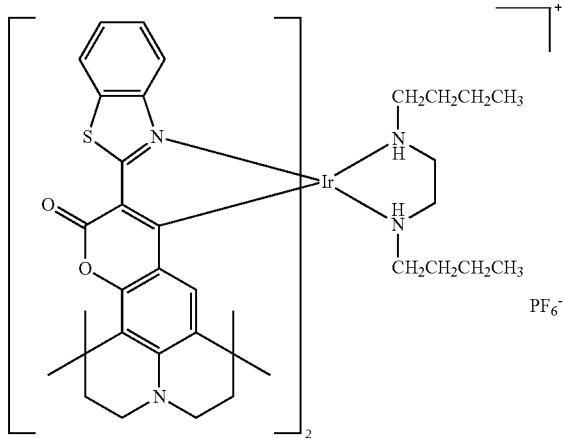

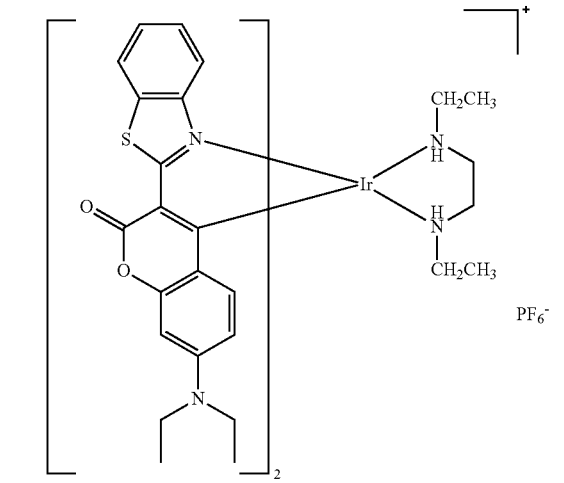

[5] The reagent for measuring oxygen concentration according to any one of [1] to [4], which is a cancer diagnostic agent.

[6] A compound represented by the following General Formula (I)' or (II).

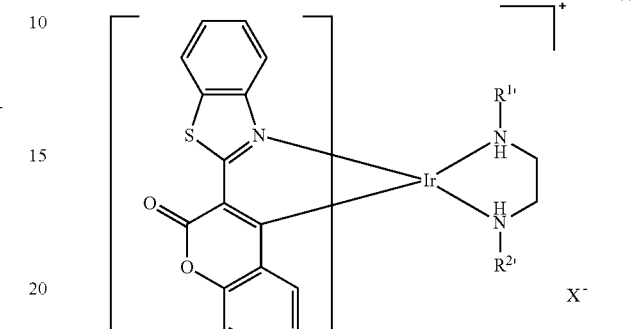

(wherein
- $R^1$ and $R^2$ each independently represent hydrogen or a $C_1$-$C_6$ hydrocarbon group;
- $R^{1'}$ and $R^{2'}$ each independently represent hydrogen or a $C_2$-$C_6$ hydrocarbon group; and
- $X^-$ represents a counter anion).

[7] The compound according to [6], wherein $R^1$ is the same as $R^2$, and $R^{1'}$ is the same as $R^{2'}$ in each formula.

[8] The compound according to [6] or [7], wherein $X^-$ is $PF_6^-$ or $Cl^-$.

[9] The compound according to any one of [6] to [8], which is any of the following compounds:

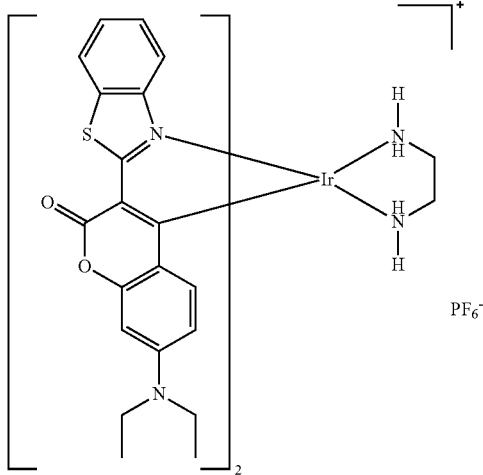

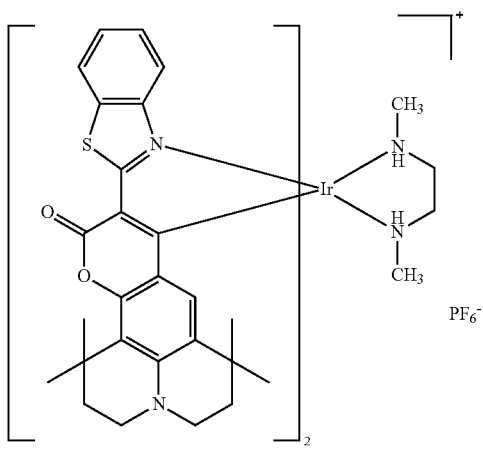

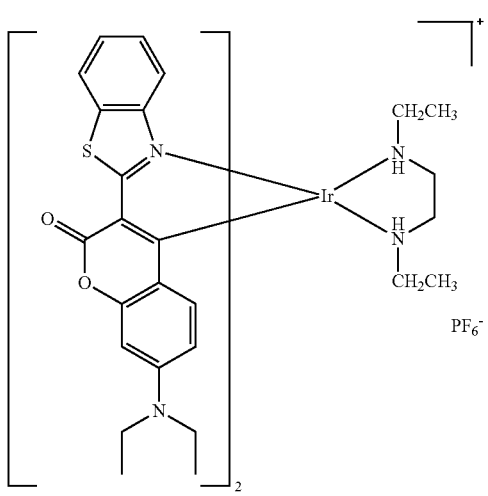

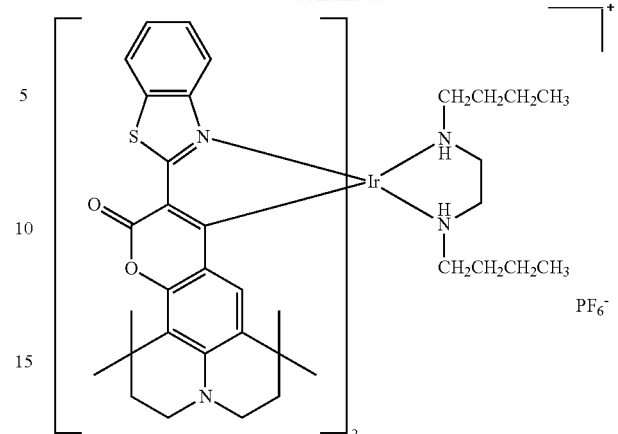

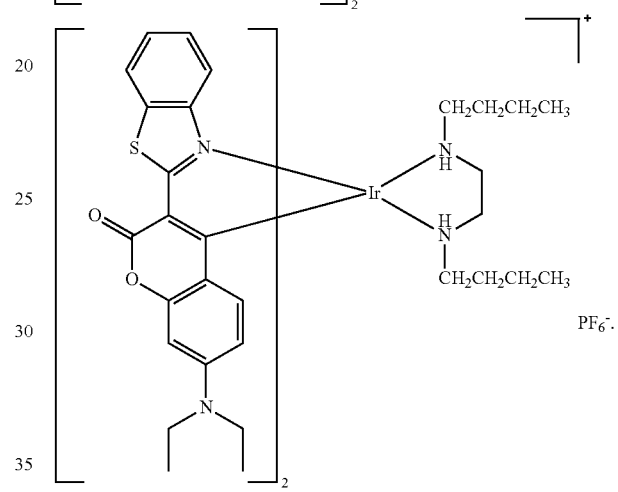

[10] A method of measuring oxygen concentration, the method comprising administering a compound represented by the General Formula (I) or (II) to a subject.

[11] A cancer diagnostic method comprising administering a compound represented by the General Formula (I) or (II) to a subject.

Effect of the Invention

By the present invention, an iridium complex having a phosphorescence lifetime of not less than 30 μs in the red region is provided.

By using an iridium complex represented by General Formula (I) or General Formula (II) together with, for example, an in vitro/in vivo imaging device, or a microplate reader having a luminescence lifetime measurement mode, imaging of a hypoxic cell/tissue or measurement/quantification of the oxygen concentration thereof can be performed.

MODE FOR CARRYING OUT THE INVENTION

Figure 1:
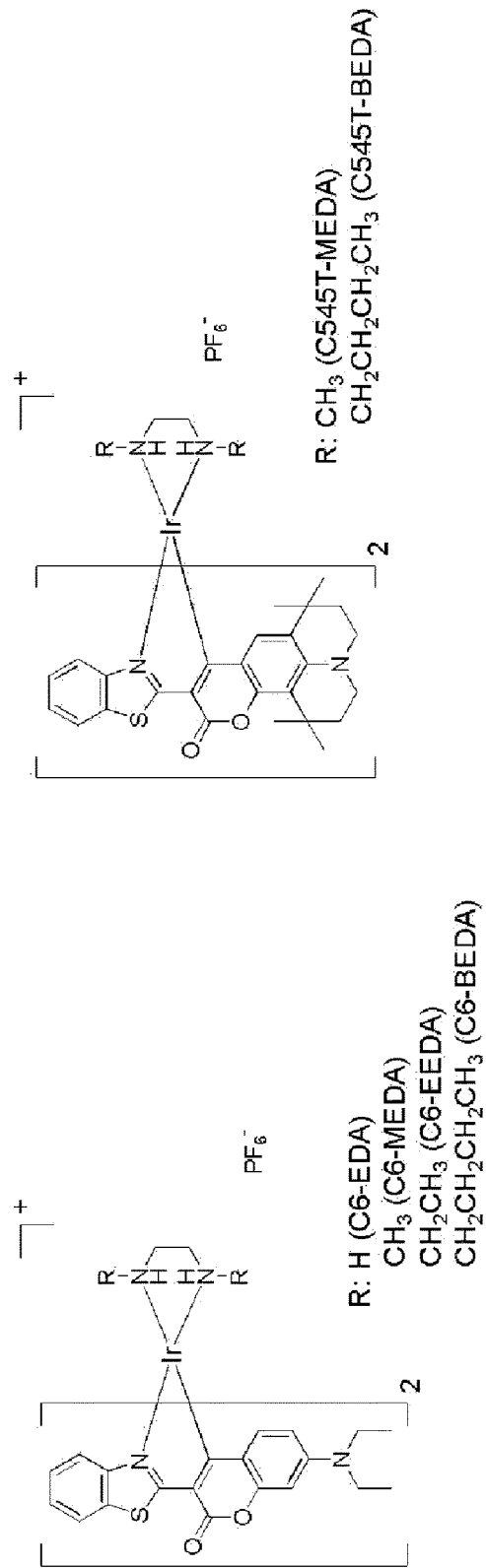
FIG. 1 shows the structural formulae of synthesized iridium complexes.

The present invention is described below.

<<Reagent for Measuring Oxygen Concentration>>

One aspect of the present invention relates to a reagent for measuring oxygen concentration (which may be hereinafter referred to as "reagent for measuring oxygen concentration of the present invention") containing a compound represented by the following General Formula (I) or (II).

The reagent for measuring oxygen concentration of the present invention comprises a compound having the structure shown below. With this structure, the reagent can have excellent photophysical properties of phosphorescence (phosphorescence quantum yield, phosphorescence lifetime, maximum phosphorescence wavelength, and the like). Further, since the reagent has the excellent photophysical properties described above in nonaqueous solvents, it is useful as a reagent for measuring oxygen concentration not only in cells, but also in living individuals.

The reagent for measuring oxygen concentration of the present invention may be composed only of a compound represented by General Formula (I) or (II). One of, or a combination of two or more of, the compounds may be used. The reagent may also comprise a compound used as a solvent, an additive, or a reagent for measuring oxygen concentration, other than the compounds represented by General Formula (I) or (II), as long as the effect of the present invention is not impaired.

When the iridium complex represented by General Formula (I) or (II) is placed in an environment such as a cell or tissue, it emits stronger phosphorescence as the oxygen concentration in the environment decreases. Thus, the oxygen concentration can be measured based on the intensity of the phosphorescence. Accordingly, for example, the oxygen concentration may be judged to be low when the intensity of phosphorescence is high.

The compound represented by General Formulae (I) or (II) is a compound having the following structure.

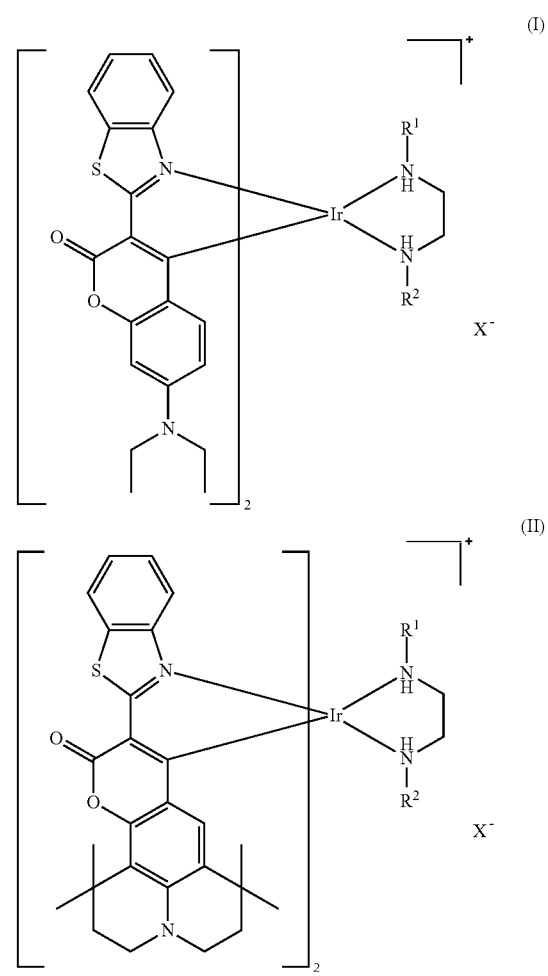

In General Formulae (I) and (II), $R^1$ an $R^2$ each independently represent hydrogen or a linear, branched, or cyclic $C_1$-$C_6$ hydrocarbon group. The hydrocarbon group is an alkyl group; or an alkenyl group or alkynyl group, which contains an unsaturated bond in an alkyl group. One or more hydrogen atoms in the hydrocarbon group may be substituted by a halogen, hydroxyl, amino, mercapto, or the like. From the viewpoint of the phosphorescence intensity, $R^1$ and $R^2$ are preferably linear $C_1$-$C_6$ hydrocarbon groups.

In each formula, $R^1$ and $R^2$ may be either the same atoms or groups, or different atoms or groups. $R^1$ and $R^2$ are preferably the same.

In General Formulae (I) and (II), $X^-$ represents a counter anion. The counter anion represented by $X^-$ is not limited as long as it is a monovalent anion. Specific examples of $X^-$ include: sulfate ion ($SO_4^{2-}$), nitrate ion ($NO_3^-$), carbonate ion ($CO_3^{2-}$ perchlorate ion ($ClO_4^-$), and halide ions such as chloride ion ($Cl^-$), bromide ion ($Br^-$), and iodide ion ($I^-$); borate ions such as tetrafluoroborate ($BF_4^-$), bromotrifluoroborate ($BBrF_3^-$), chlorotrifluoroborate ($BClF_3^-$), trifluoromethoxyborate ($BF_3(OCH_3)^-$), trifluoroethoxyborate ($BF_3(OC_2H_5)^-$), trifluoroallyloxyborate ($BF_3(OC_3H_5)^-$), tetraphenylborate ($B(C_6H_5)_4^-$), tetrakis(3,5-bis(trifluoromethyl)phenyl)borate ($B(3,5-(CF_3)_2C_6H_3)_4^-$=$BArF_4^-$), bromotriphenylborate ($BBr(C_6H_5)_3^-$), chlorotriphenylborate ($BCl(C_6H_5)_3^-$), methoxytriphenylborate ($B(OCH_3)(C_6H_5)_3^-$), ethoxytriphenylborate ($B(OC_2H_5)(C_6H_5)_3^-$), allyloxytriphenylborate ($B(OC_3H_5)(C_6H_5)_3^-$), tetrakis(pentafluorophenyl)borate (B(C$_6$F$_5$)$_4$), bromotris(pentafluorophenyl)borate (BBr(C$_6$F$_5$)$_3^-$), chlorotris(pentafluorophenyl)borate (BCl(C$_6$F$_5$)$_3^-$), methoxytris(pentafluorophenyl)borate (B(OCH$_3$)(C$_6$F$_5$)$_3^-$), ethoxytris(pentafluorophenyl)borate (B(OC$_2$H$_5$)(C$_6$F$_5$)$_3^-$), and allyloxytris(pentafluorophenyl)borate (B(OC$_3$H$_5$)(C$_6$F$_5$)$_3^-$); sulfonate ions such as methanesulfonate (CH$_3$SO$_3^-$), trifluoromethanesulfonate (CF$_3$SO$_3^-$), nonafluorobutanesulfonate (C$_4$F$_9$SO$_3^-$), benzenesulfonate (C$_6$H$_5$SO$_3^-$), and p-toluenesulfonate (p-CH$_3$-C$_6$H$_4$SO$_3^-$); carboxylate ions such as acetate ion (CH$_3$CO$_2^-$), trifluoroacetate ion (CF$_3$CO$_2^-$), trichloroacetate ion (CCl$_3$CO$_2^-$), propionate ion (C$_2$H$_5$CO$_2^-$), and benzoate ion (C$_6$H$_5$CO$_2^-$); phosphate ions such as hexafluorophosphate (PF$_6^-$); arsenate ions such as hexafluoroarsenate ion (AsF$_6^-$); antimonate ions such as hexafluoroantimonate (SbF$_6^-$); and silicate anions such as hexafluorosilicate (SiF$_6^-$).

Among these counter ions, from the viewpoint of availability of the raw material and the catalytic activity, PF$_6^-$ or Cl$^-$ is preferred in the present invention.

Specific examples of the compound represented by General Formula (I) or (II) include the compounds listed below. However, the present invention is not limited thereto.

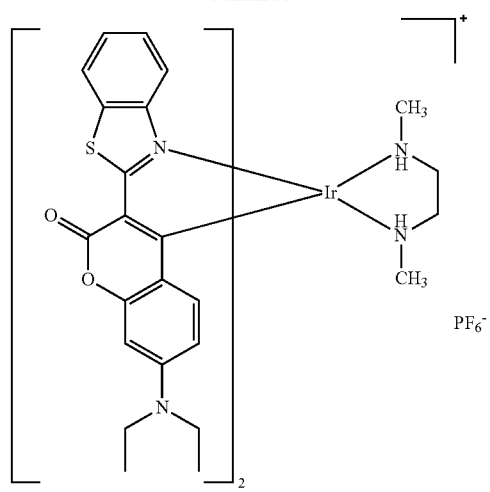

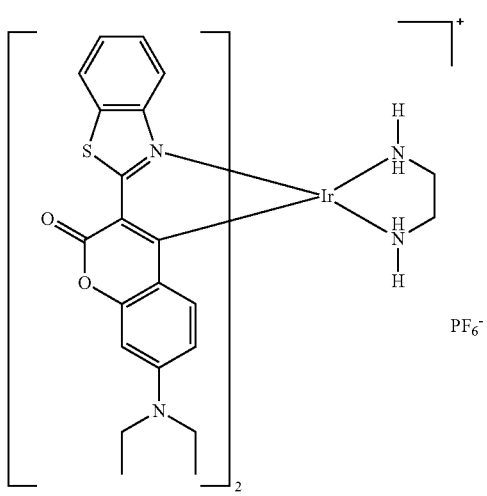

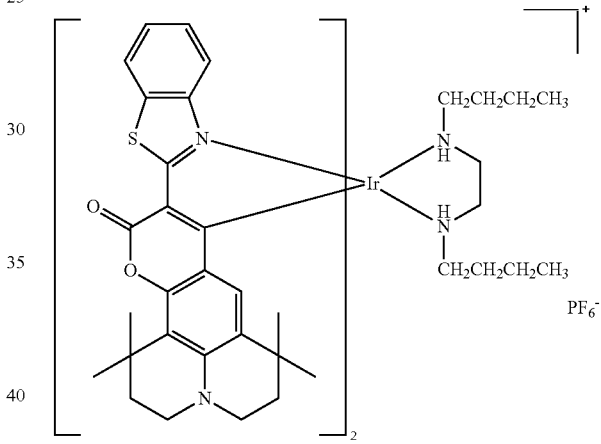

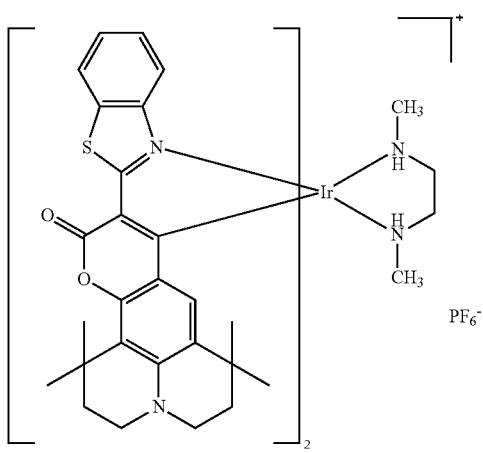

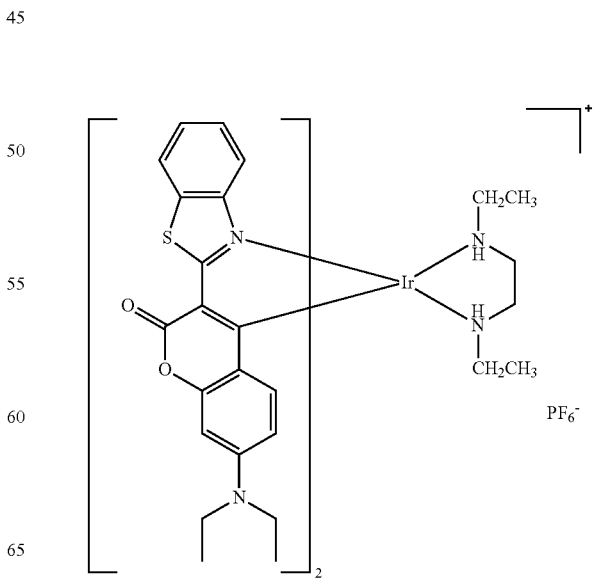

-continued

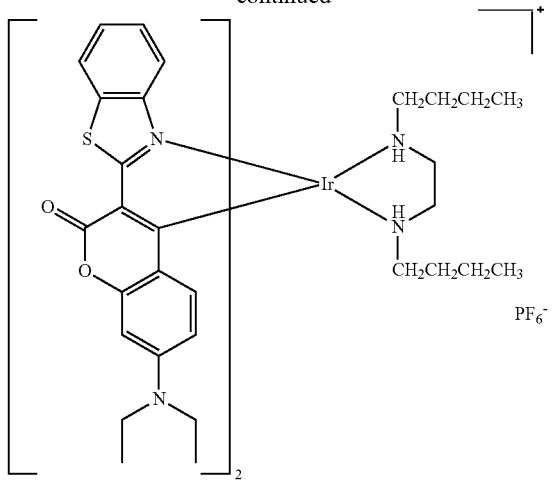

Photophysical properties of the phosphorescence of the compound represented by General Formula (I) or (II), such as the maximum absorption/phosphorescence wavelength, the phosphorescence quantum yield ($\Phi_p$), and the phosphorescence lifetime ($\tau_p$), can be measured by known measurement methods. For example, the maximum absorption/phosphorescence wavelength can be measured using a spectrophotometer or the like, and the phosphorescence quantum yield can be measured using a luminescence quantum yield measurement apparatus or the like, for a sample in which the compound represented by General Formula (I) or (II) is dissolved in a solvent or the like. Regarding the phosphorescence lifetime, the fluorescence lifetime ($\tau_p$) of the compound in each solvent can be measured using a phosphorescence lifetime measurement apparatus.

The phosphorescence quantum yield ($\Phi_p$) is not limited, and may be changed in accordance with the structure of the compound, the type of the solvent, and the like. It is, for example, not less than 0.2, not less than 0.35, or not less than 0.6.

The phosphorescence lifetime ($\tau_p$) is not limited, and may be changed in accordance with the structure of the compound, the type of the solvent, and the like. It is, for example, not less than 20.0 μs (microseconds), not less than 30.0 μs, not less than 40.0 μs, or not less than 50.0 μs.

The maximum excitation wavelength of the compound represented by General Formula (I) or (II) in a solvent is not limited, and may be changed in accordance with the structure of the compound, the type of the solvent, and the like. It is, for example, 470 nm to 500 nm. The maximum phosphorescence wavelength in the solvent may also be appropriately set, and may be, for example, 570 nm to 630 nm.

<Method of Producing Compound>

The compound represented by General Formula (I) or General Formula (II) may be produced based on the description in the later-described Examples or a known organic synthesis method.

<<Compound of Present Invention>>

Among the compounds represented by General Formula (I) or (II), the compounds represented by the following General Formula (I)' or (II) are novel compounds synthesized by the present invention. Thus, one aspect of the present invention relates to a compound represented by the following General Formula (I)' or (II) (which may be hereinafter referred to as "compound of the present invention").

The compound represented by General Formula (I)' or (II) is a compound having the following structure.

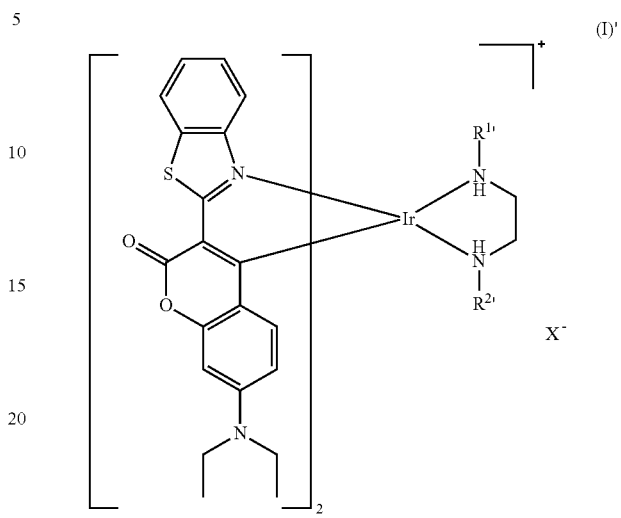

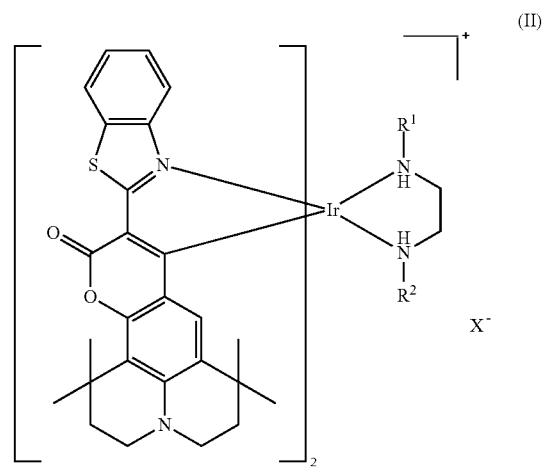

In the General Formulae (I)' and (II), $R^1$, $R^2$, and $X^-$ have the same meanings as described above. $R^{1'}$ an $R^{2'}$ each independently represent hydrogen or a linear, branched, or cyclic $C_2$-$C_6$ hydrocarbon group. $R^{1'}$ and $R^{2'}$ are the same as $R^1$ and $R^2$ except for the number of carbon atoms in the hydrocarbon group.

Specific examples of the compound represented by General Formula (I)' or (II) include the compounds listed below. However, the present invention is not limited thereto.

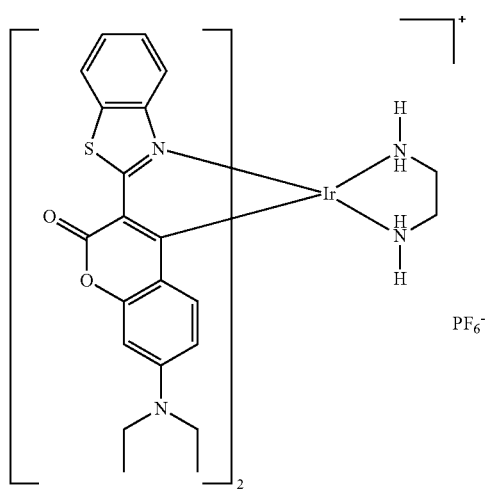

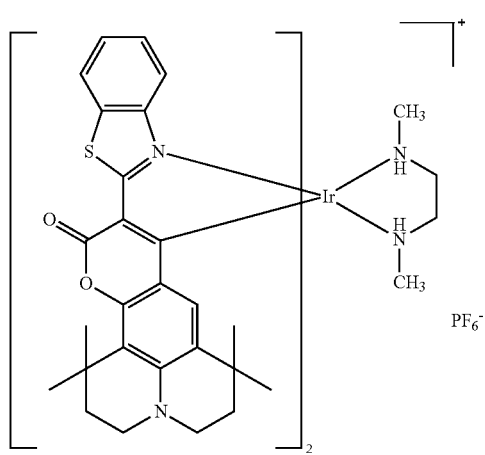

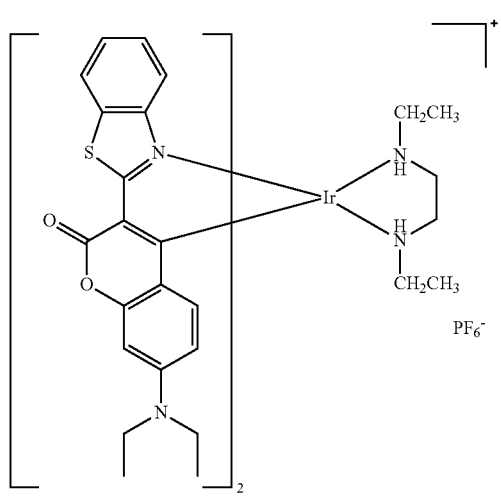

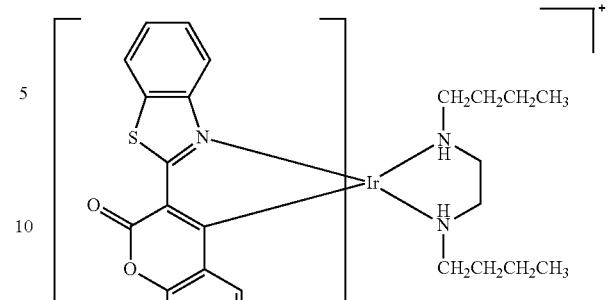

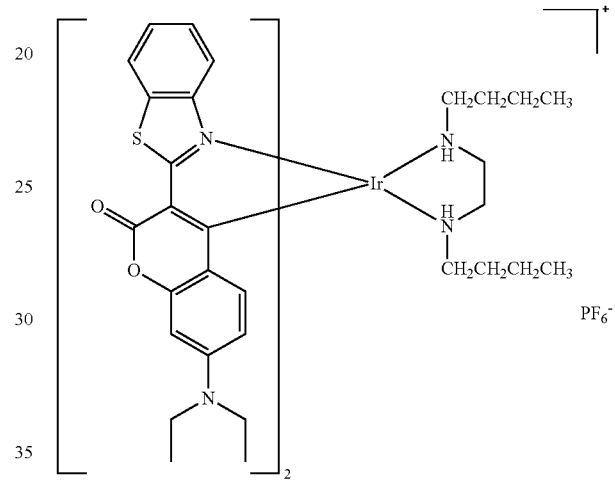

<Method of Measuring Oxygen Concentration>

One aspect of the present invention relates to a method of measuring oxygen concentration, the method comprising the step of administering the reagent for measuring oxygen concentration of the present invention to a biological sample or a living individual (other than a human) (which method may be hereinafter referred to as "method of measuring oxygen concentration of the present invention").

The method of measuring oxygen concentration of the present invention may further comprise the step of measuring the reagent for measuring oxygen concentration of the present invention. The measurement of the reagent for measuring oxygen concentration may be carried out based on a known detection method for a phosphorescent reagent.

As described above, the phosphorescence intensity of the iridium complex represented by General Formula (I) or (II) changes depending on the oxygen concentration in the surrounding environment. Accordingly, for example, the oxygen concentration may be judged to be low when the intensity of phosphorescence is high. Further, by estimating the relationship between the oxygen concentration and the phosphorescence intensity in advance, quantitative measurement of the oxygen concentration is also possible.

The reagent for measuring oxygen concentration of the present invention may be used, for example, as a measurement reagent for measuring the oxygen concentration in a biological sample. The biological sample is not limited, and may be, for example, a cell or an isolated tissue. The reagent for measuring oxygen concentration of the present invention can also be applied to, and used to measure, a living body, and may be used as a measurement reagent for detecting the oxygen concentration in a cell, tissue, or the like in a living individual.

The reagent for measuring oxygen concentration of the present invention enables measurement of the intracellular oxygen concentration. Thus, the reagent is useful as a measurement reagent for the intracellular oxygen concentration.

The measurement of the intracellular oxygen concentration may be carried out by, for example, as follows.

The reagent for measuring oxygen concentration of the present invention is added to the cell to be subjected to the measurement.

Thereafter, by monitoring a phosphorescence signal of the reagent for measuring oxygen concentration of the present invention using, for example, an in vitro/in vivo imaging device, or a microplate reader having a luminescence lifetime measurement mode, the intracellular oxygen concentration can be measured.

The amount of the reagent for measuring oxygen concentration of the present invention added to the cell may be appropriately changed in accordance with the cell used, the oxygen concentration, and the like. The reagent may be added to the cell to a final concentration of, for example, 0.01 to 1000 μM, preferably 0.1 to 100 μM.

The culture time may be appropriately changed in accordance with the cell, the compound used, and the like. The culture may be carried out for, for example, 0.5 to 10 hours, preferably 1 to 2 hours.

In cases where the reagent for measuring oxygen concentration of the present invention is added to the cell after dissolving the reagent in a solvent, examples of the solvent that may be used include, but are not limited to, organic solvents such as n-hexane, dibutyl ether, ethyl acetate, acetonitrile, and dimethyl sulfoxide.

The cell to which the reagent for measuring oxygen concentration of the present invention is added is not limited as long as it is a cell whose oxygen concentration is to be measured. Examples of the cell include cultured cell lines and primary cultured cells.

The reagent for measuring oxygen concentration of the present invention also enables measurement of the oxygen concentration in a tissue of a living individual (living organism individual). Thus, the reagent is useful as a measurement reagent for the oxygen concentration in a tissue.

The measurement of the oxygen concentration in the tissue may be carried out by, for example, as follows.

The reagent for measuring oxygen concentration of the present invention is added to the individual to be subjected to the measurement.

Thereafter, by monitoring a phosphorescence signal of the reagent for measuring oxygen concentration of the present invention using, for example, an in vivo imaging device, the reagent for measuring oxygen concentration in the tissue can be measured.

The amount of the reagent for measuring oxygen concentration of the present invention added to the individual may be appropriately changed in accordance with the individual used, the oxygen concentration, and the like. The reagent may be administered to the individual at a dose within the range of, for example, 0.01 to 1000 mol/kg body weight, preferably 0.1 to 100 mol/kg body weight.

Examples of the dosage form of the reagent for measuring oxygen concentration of the present invention include intravenous administration, subcutaneous administration, and intramuscular administration.

In cases where the reagent for measuring oxygen concentration of the present invention is added to the tissue after dissolving the reagent in a solvent, examples of the solvent that may be used include, but are not limited to, organic solvents such as n-hexane, dibutyl ether, ethyl acetate, acetonitrile, and dimethyl sulfoxide. Further, the reagent may be administered in combination with a biocompatible liquid.

Examples of the tissue to be subjected to the detection by the reagent for measuring oxygen concentration of the present invention include, but are not limited to, organs such as the skin, muscle, liver, heart, pancreas, and kidney).

Examples of the organism individual to which the reagent is to be administered include, but are not limited to, vertebrates including mammals (such as mice, humans, pigs, dogs, rabbits, and humans), and invertebrates.

<<Cancer Diagnostic Agent>>

One aspect of the present invention relates to a cancer diagnostic agent comprising the reagent for measuring oxygen concentration of the present invention (which agent may be hereinafter referred to as "cancer diagnostic agent of the present invention").

As described above, when the iridium complex represented by General Formula (I) or (II) is placed in an environment such as a cell or tissue, it emits stronger phosphorescence as the oxygen concentration in the environment decreases. Thus, for example, by administering the iridium complex represented by General Formula (I) or (II) to an experimental animal such as a mouse or rat, or to a human, a site with a decreased oxygen concentration can be detected. Based on the fact that oxygen supply is insufficient in cancer tissues, the reagent can also be used as a cancer diagnostic agent by detecting a site where the oxygen concentration is decreased, and specifically staining the cancer tissue.

For example, by administering the iridium complex to a specimen, and irradiating the specimen with a visible light from the outside of the living body, phosphorescence can be observed. By this, the cancer tissue can be non-invasively, sensitively, and selectively visualized. Moreover, since imaging of phosphorescence is possible, the reagent can also be used as an imaging reagent for detection of cancers.

Further, the iridium complex can also be used for, for example, cancer studies and evaluation of cancer therapeutic agents using experimental animals.

EXAMPLES

The present invention is described below concretely by showing Examples. However, these are exemplification of the present invention, and the scope of the present invention is not limited to these Examples.

Synthesis Examples

Compounds in the present invention were synthesized as follows.

Scheme 1 illustrates the synthetic pathway of C6-EDA, C6-MEDA, C6-EEDA, and C6-BEDA, and Scheme 2 illustrates the synthetic pathway of C545T-MEDA and C545T-BEDA.

Scheme 1

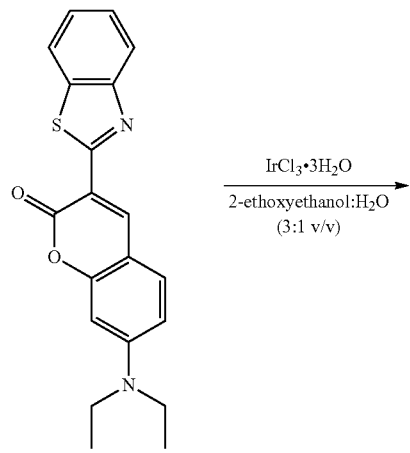

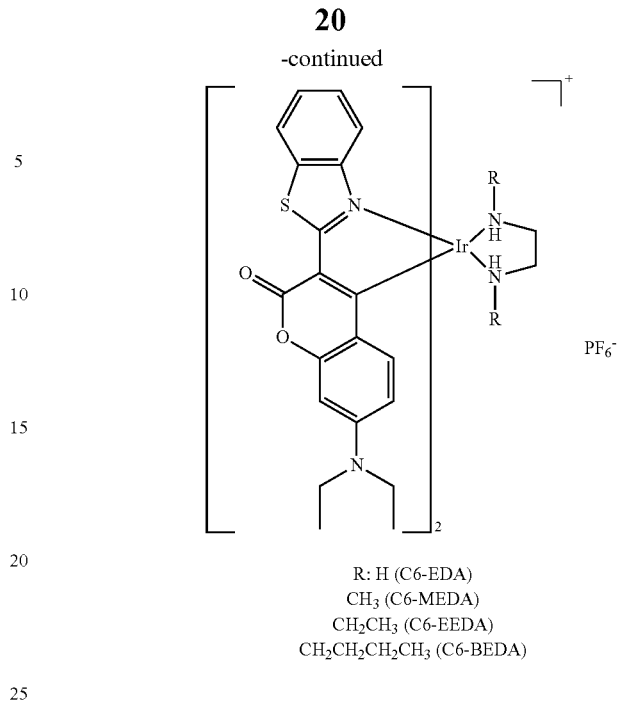

R: H (C6-EDA)
CH₃ (C6-MEDA)
CH₂CH₃ (C6-EEDA)
CH₂CH₂CH₂CH₃ (C6-BEDA)

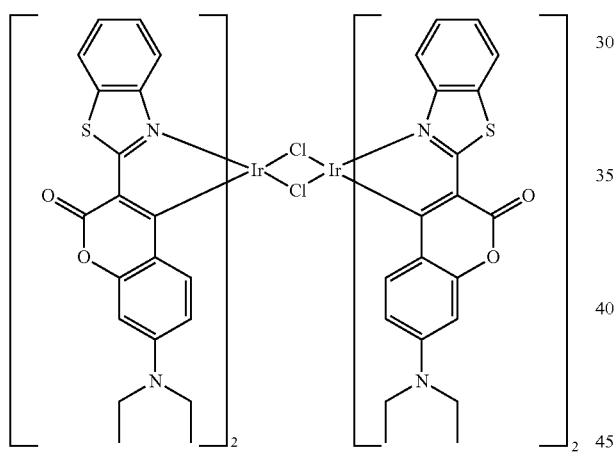

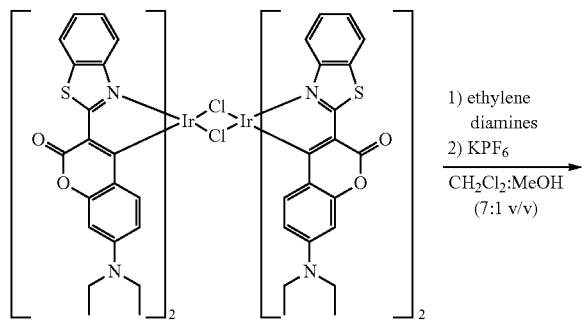

Coumarin 6 (0.735 g, 2.1 mmol) and iridium chloride trihydrate (0.353 g, 1.0 mmol) were added to a mixed solvent of 2-ethoxyethanol:water (30 mL:10 mL, v/v), and the resulting mixture was refluxed at 140° C. for 15 hours. After air cooling, the precipitate was filtered and dried, followed by collecting the filtrate (chlorine-bridged dinuclear complex) (yield: 60%). The chlorine-bridged dinuclear complex (0.185 g, 0.1 mmol) and an ethylenediamine (0.5 mmol) were added to a mixed solvent of dichloromethane:methanol (35 mL:5 mL, v/v), and the resulting mixture was refluxed for 4 hours. After air cooling, KPF$_6$ (0.092 g, 0.5 mmol) was added thereto, and the resulting mixture was stirred for 1 hour. After removing excessive KPF$_6$ by filtration, the filtrate was evaporated under reduced pressure. The resulting crude product was produced (silica gel column; developing solvent, chlorophyll:methanol (95:5, v/v)) using a flash automatic purification apparatus (Isolera Spektra, Biotage), to obtain a compound.

Bis[3-(benzo[d]thiazol-2-yl)-7-(diethylamino)-2H-chromen-2-one-κN, κC⁴]ethane-1,2-diamine iridium (III) hexafluorophosphate (C6-EDA)

Yield: 27%

ESI-MS (m/z) of C6-EDA: calcd for $C_{42}H_{42}IrN_6O_4S_2$ [M+H]$^+$:951.2, found: 951.2.

Bis[3-(benzo[d]thiazol-2-yl)-7-(diethylamino)-2H-chromen-2-one-κN, κC⁴]N¹,N²-dimethylethane-1,2-diamine iridium(III) hexafluorophosphate (C6-MEDA)

Yield: 35%

$^1$H NMR (400 MHz, CDCl$_3$, TMS): δ 8.02-8.00 (d, 2H), 7.58 (t, 2H), 7.45 (t, 2H), 7.06-7.04 (d, 2H), 6.27-6.26 (d, 2H), 5.87-5.84 (d, 2H), 5.75-5.72 (dd, 2H), 4.78 (s, 2H), 3.21 (m, 8H), 2.08-2.07 (d, 6H), 1.87 (m, 4H), 1.03 (t, 12H)

ESI-MS (m/z) of C6-MEDA: calcd for $C_{44}H_{46}IrN_6O_4S_2$ [M+H]$^+$:979.2, found: 979.1.

21

Bis[3-(benzo[d]thiazol-2-yl)-7-(diethylamino)-2H-chromen-2-one-κN, κC⁴]N¹,N²-diethylethane-1,2-diamine iridium(III) hexafluorophosphate (C6-EEDA)

Yield: 69%

¹H NMR (400 MHz, CDCl₃, TMS):

ESI-MS (m/z) of C6-EEDA: calcd for $C_{46}H_{50}IrN_6O_4S_2$ [M+H]⁺:1007.3, found: 1007.4.

22

Bis[3-(benzo[d]thiazol-2-yl)-7-(diethylamino)-2H-chromen-2-one-κN, κC⁴]N¹,N²-dibutylethane-1,2-diamine iridium(III) hexafluorophosphate (C6-BEDA)

Yield: 47%

¹H NMR (400 MHz, CDCl₃, TMS): δ 8.06-8.05 (d, 2H), 7.57 (t, 2H), 7.51 (t, 2H), 7.15-7.13 (d, 2H), 6.29-6.28 (d, 2H), 5.91-5.88 (d, 2H), 5.78-5.74 (dd, 2H), 4.55 (s, 2H), 3.25 (m, 8H), 2.06 (m, 4H), 1.88 (m, 4H), 1.23 (m, 8H), 1.06 (t, 12H), 0.817 (t, 6H)

ESI-MS (m/z) of C6-BEDA: calcd for $C_{50}H_{58}IrN_6O_4S_2$ [M+H]⁺:1063.4, found:1063.5

Scheme 2

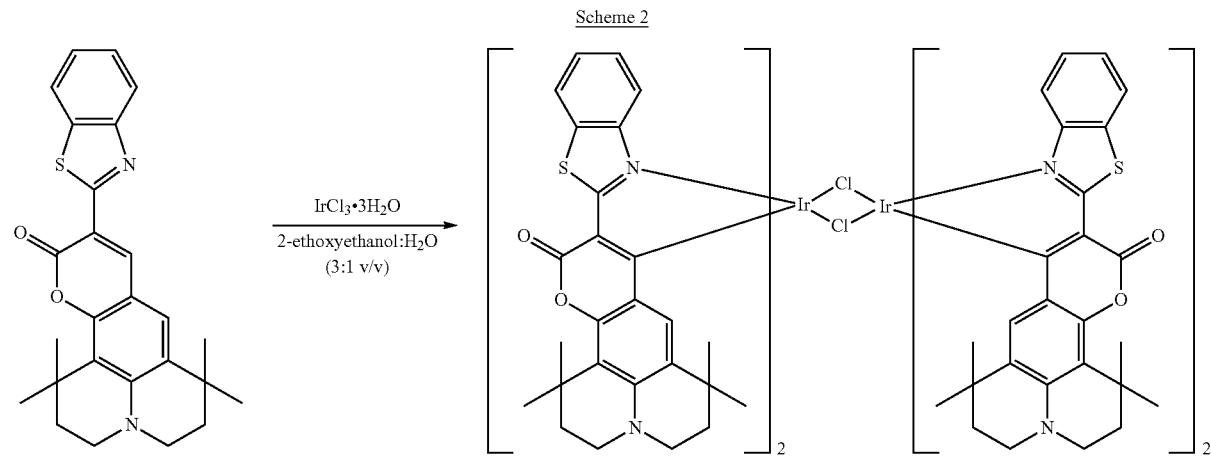

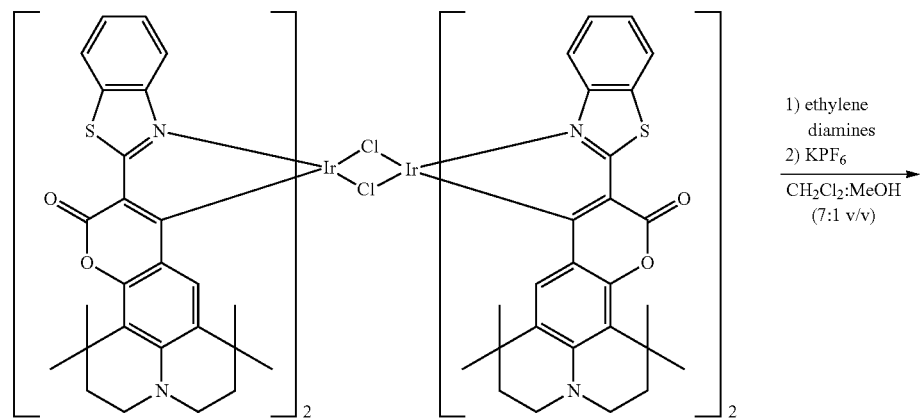

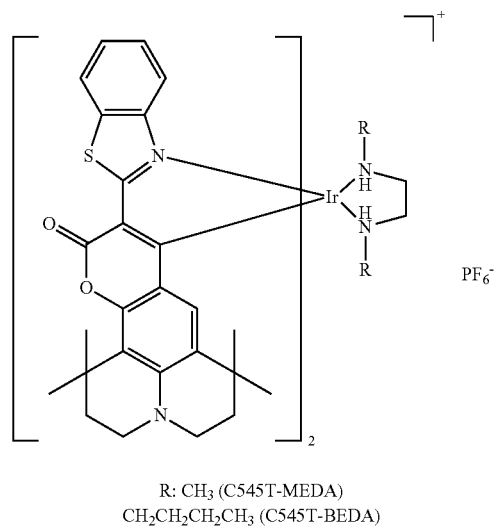

R: CH₃ (C545T-MEDA)
CH₂CH₂CH₂CH₃ (C545T-BEDA)

Coumarin 545T (0.903 g, 2.1 mmol) and iridium chloride trihydrate (0.353 g, 1.0 mmol) were added to a mixed solvent of 2-ethoxyethanol:water (30 mL:10 mL, v/v), and the resulting mixture was refluxed at 140° C. for 15 hours. After air cooling, the precipitate was filtered and dried, followed by collecting the filtrate (chlorine-bridged dinuclear complex) (yield: 40%). The chlorine-bridged dinuclear complex (0.217 g, 0.1 mmol) and an ethylenediamine (0.5 mmol) were added to a mixed solvent of dichloromethane:methanol (35 mL:5 mL, v/v), and the resulting mixture was refluxed for 4 hours. After air cooling, $KPF_6$ (0.092 g, 0.5 mmol) was added thereto, and the resulting mixture was stirred for 1 hour. After removing excessive $KPF_6$ by filtration, the filtrate was evaporated under reduced pressure. The resulting crude product was produced (silica gel column; developing solvent, chlorophyll:methanol (95:5, v/v)) using a flash automatic purification apparatus (Isolera Spektra, Biotage), to obtain a compound.

Bis[10-(benzo[d]thiazol-2-yl)-1,1,7,7-tetramethyl-2,3,6,7-tetrahydro-1H-pyrano [2,3-f]pyrido[3,2,1-ij]quinolin-11(5H)-one-κN, κC⁴]N¹,N²-dimethylethane-1,2-diamine iridium(III) hexafluorophosphate (C545T-MEDA)

Yield: 20%
¹H NMR (400 MHz, CDCl₃, TMS): δ 8.01-7.99 (d, 2H), 7.55 (t, 2H), 7.43 (t, 2H), 7.02-7.00 (d, 2H), 6.12 (s, 2H), 4.65 (s, 2H), 3.13 (m, 8H), 2.43 (m, 4H), 2.10-2.08 (d, 6H), 1.55 (m, 12H), 1.44 (m, 12H), 0.524 (t, 8H)
ESI-MS (m/z) of C545T-MEDA: calcd for $C_{56}H_{62}IrN_6O_4S_2$ [M+H]⁺:1139.4, found: 1139.6.

Bis[10-(benzo[d]thiazol-2-yl)-1,1,7,7-tetramethyl-2,3,6,7-tetrahydro-1H-pyrano [2,3-f]pyrido[3,2,1-ij]quinolin-11(5H)-one-κN, κC⁴]N¹,N²-dibutylethane-1,2-diamine iridium(III) hexafluorophosphate (C545T-BEDA)

Yield: 14%
¹H NMR (400 MHz, CDCl₃, TMS): δ 8.04-8.02 (d, 2H), 7.48 (m, 4H), 7.05-7.03 (d, 2H), 6.13 (s, 2H), 4.33 (s, 2H), 3.10 (m, 8H), 2.48 (m, 4H), 2.05 (m, 4H), 1.57 (m, 12H), 1.45 (m, 20H), 0.857 (m, 8H), 0.558 (t, 6H)
ESI-MS (m/z) of C545T-BEDA: calcd for $C_{62}H_{74}IrN_6O_4S_2$ [M+H]⁺:1223.5, found: 1223.8.

<Measurement Methods>

Photophysical parameters of the compounds, and luminescence micrographs using the compounds were measured using the following apparatuses.

Absorption spectrum: ultraviolet and visible spectrophotometer, Ubest-550; manufactured by JASCO Corporation Phosphorescence spectrum: multichannel spectroscope, PMA-12; manufactured by Hamamatsu Photonics K. K.

Phosphorescence quantum yield: luminescence quantum yield measurement apparatus, C9920-01; manufactured by Hamamatsu Photonics K. K.

Phosphorescence lifetime: compact fluorescence lifetime measurement apparatus, Quantaurus-Tau; manufactured by Hamamatsu Photonics K.K.

Luminescence micrograph: inverted research microscope, IX-71; manufactured by Olympus Corporation Luminescence intensity, luminescence lifetime: microplate reader, Infinite 200 PRO; manufactured by TECAN.

Example 1

The iridium complexes synthesized in the present invention (FIG. 1) comprise coumarin 6 or coumarin 545T as an aromatic ligand, and dialkylethylenediamine as an ancillary ligand.

Figure 2:
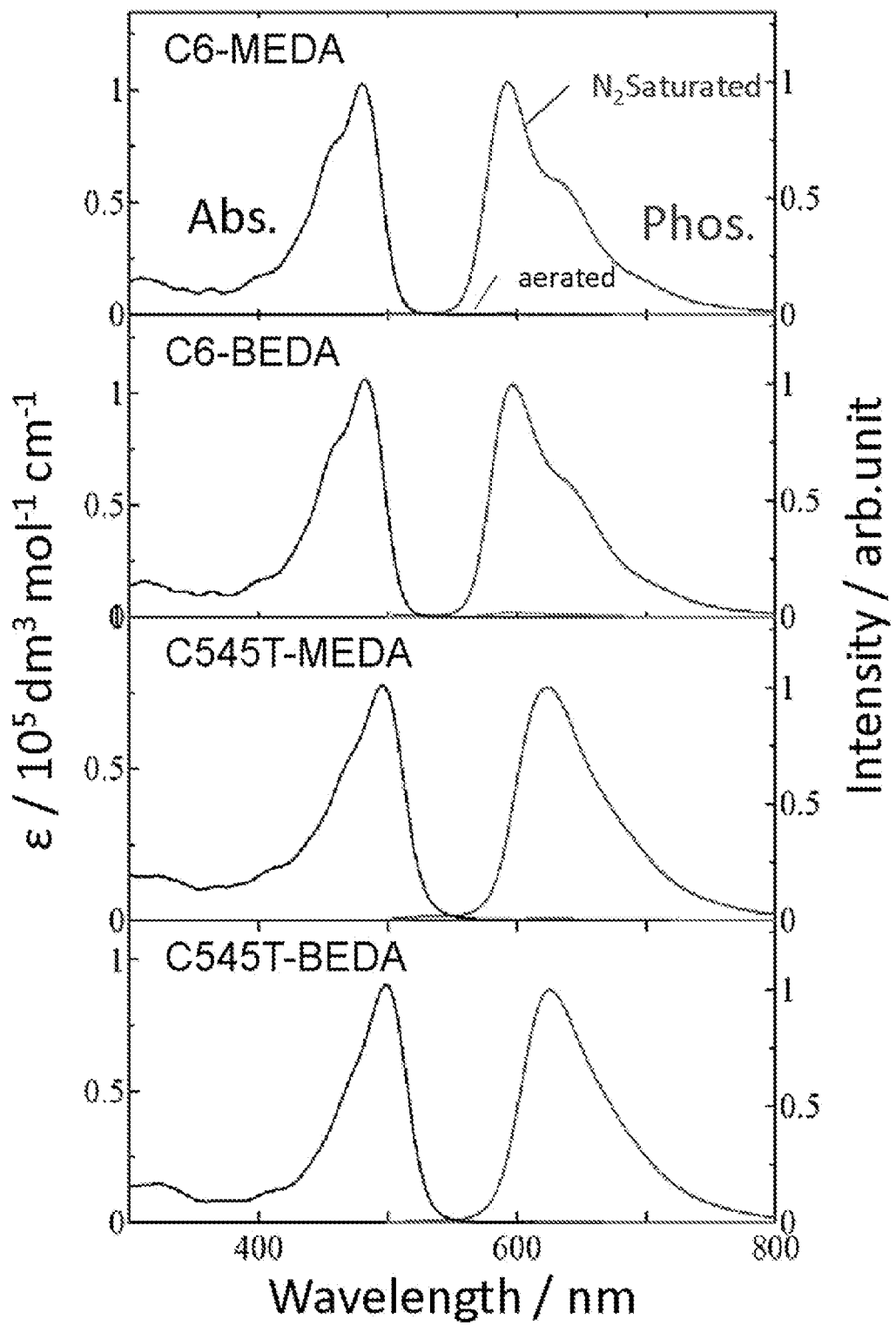
FIG. 2 shows the absorption/phosphorescence spectra of C6-MEDA, C6-BEDA, C545T-MEDA, and C545T-BEDA in acetonitrile.

FIG. 2 shows the absorption/emission spectra of C6-MEDA, C6-BEDA, C545T-MEDA, and C545T-BEDA in acetonitrile at room temperature. Table 1 shows their photophysical parameters.

[Table 1]

TABLE 1

Photophysical properties of iridium complexes in a solution

| Iridium complex | $\lambda_{abs}$/nm, $\varepsilon$/dm³mol⁻¹cm⁻¹ | $\lambda_{phos}$/nm | $\Phi_p$ | $\tau_p$/μs |
|---|---|---|---|---|
| C6-EDA | 473, 91,700 | 577 | 0.82 | 38.9 |
| C6-MEDA | 481, 103,000 | 593 | 0.75 | 38.7 |

TABLE 1-continued

Photophysical properties of iridium complexes in a solution

| Iridium complex | $\lambda_{abs}$/nm, $\varepsilon$/dm$^3$mol$^{-1}$cm$^{-1}$ | $\lambda_{phos}$/nm | $\Phi_p$ | $\tau_p$/µs |
| --- | --- | --- | --- | --- |
| C6-BEDA | 482, 106,000 | 594 | 0.65 | 34.8 |
| C545T-MEDA | 496, 77,000 | 621 | 0.36 | 46.5 |
| C545T-BEDA | 499, 90,600 | 622 | 0.40 | 53.7 |
| PPZ4DMMD | 484, 36,000 | 679 | 0.11 | 18.7 |
| PPZ3DMMD | 484, 34,500 | 679 | 0.12 | 17.9 |

The maximum absorption wavelength ($\lambda_{abs}$) was found at 473 to 499 nm, and the molecular extinction coefficient ($\varepsilon$/dm$^3$ mol$^{-1}$ cm$^{-1}$) was not less than 70,000 dm$^3$ mol$^{-1}$ cm$^{-1}$. The maximum emission wavelength ($\lambda_{phos}$) was found at 577 to 622 nm. Under air-saturated conditions, the luminescence intensity remarkably decreased compared to that under deoxidized (nitrogen-saturated) conditions. Therefore, the observed luminescence can be identified as a phosphorescence. Regarding the phosphorescence quantum yield ($\Phi_p$) under deoxidized conditions, the iridium complexes comprising coumarin 6 as a ligand showed values of not less than 0.6, and the iridium complexes comprising C545T as a ligand showed values of not less than 0.35. These are higher quantum yields compared to those of the iridium complexes that have been reported so far. Regarding the phosphorescence lifetime ($\tau_p$) under deoxidized conditions, all complexes showed values of not less than 30 µs, which are phosphorescence lifetimes longer than those of the iridium complexes that have been reported so far.

Example 2

Figure 3:
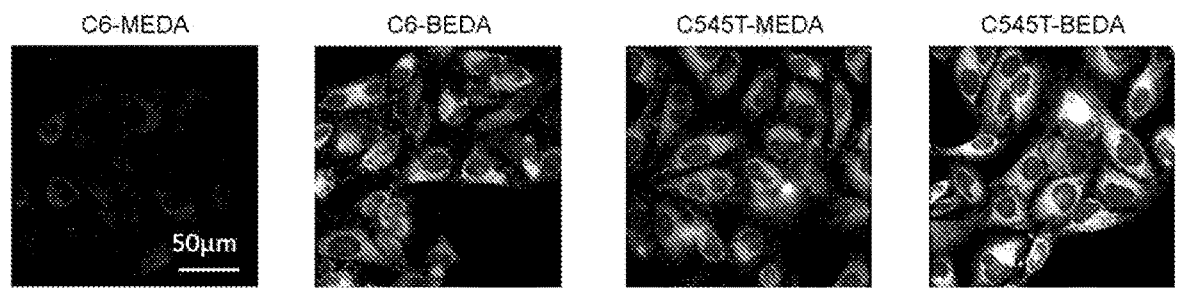
FIG. 3 shows phosphorescence imaging images (drawing-substituting photographs) of HeLa cells to which the respective iridium complexes were added.
Figure 4:
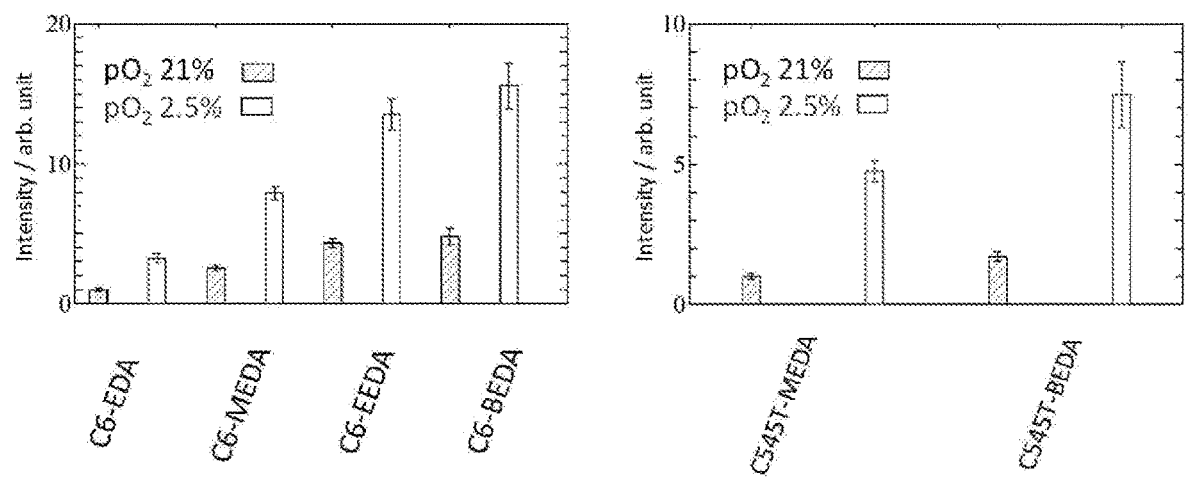
FIG. 4 shows the phosphorescence intensity of each iridium complex incorporated in HeLa cells.

Using the iridium complexes developed, imaging experiments for living cells were carried out. FIG. 3 shows phosphorescence imaging images obtained by adding each iridium complex to HeLa cells to a final concentration of 500 nM, and observing the cells after 2 hours of culture. Based on comparison between C6-MEDA and C6-BEDA, and between C545T-MEDA and C545T-BEDA, it can be seen that C6-BEDA and C545T-BEDA exhibit higher phosphorescence intensities. For quantitative evaluation, the phosphorescence intensity was measured using a microplate reader (FIG. 4). The results indicate that the phosphorescence intensity increases as the ancillary ligand has more alkyl chains.

Figure 5:
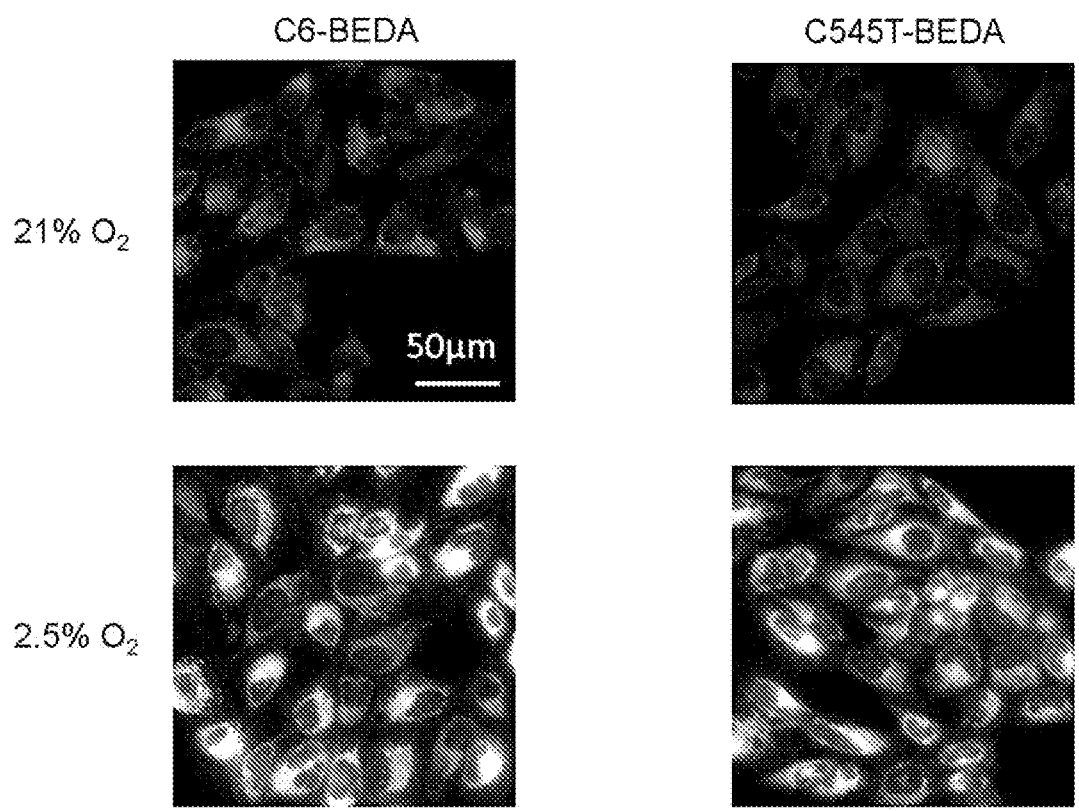
FIG. 5 shows phosphorescence imaging images (drawing-substituting photographs) of HeLa cells to which the respective iridium complexes were added, wherein dependence on the culture oxygen partial pressure is shown.

For C6-BEDA and C545T-BEDA, intracellular oxygen responsiveness was evaluated. FIG. 5 shows phosphorescence imaging images of HeLa cells obtained by adding each iridium complex to the cells to a final concentration of 500 nM, culturing the cells for 2 hours, and then carrying out the measurement under an oxygen partial pressure of 21% or under an oxygen partial pressure of 2.5%. Since remarkable increases in the phosphorescence intensity were found under the oxygen partial pressure of 2.5%, the complexes were found to exhibit oxygen responsiveness even in cells. Further, as a result of measurement of the phosphorescence intensity using a microplate reader, it was shown that the phosphorescence intensity increases 3-fold or more under an oxygen partial pressure of 2.5% (FIG. 4). It was thus found that C6-BEDA and C545T-BEDA are incorporated into cells within a short time (within 2 hours) and exhibit oxygen-dependent phosphorescence.

Figure 6:
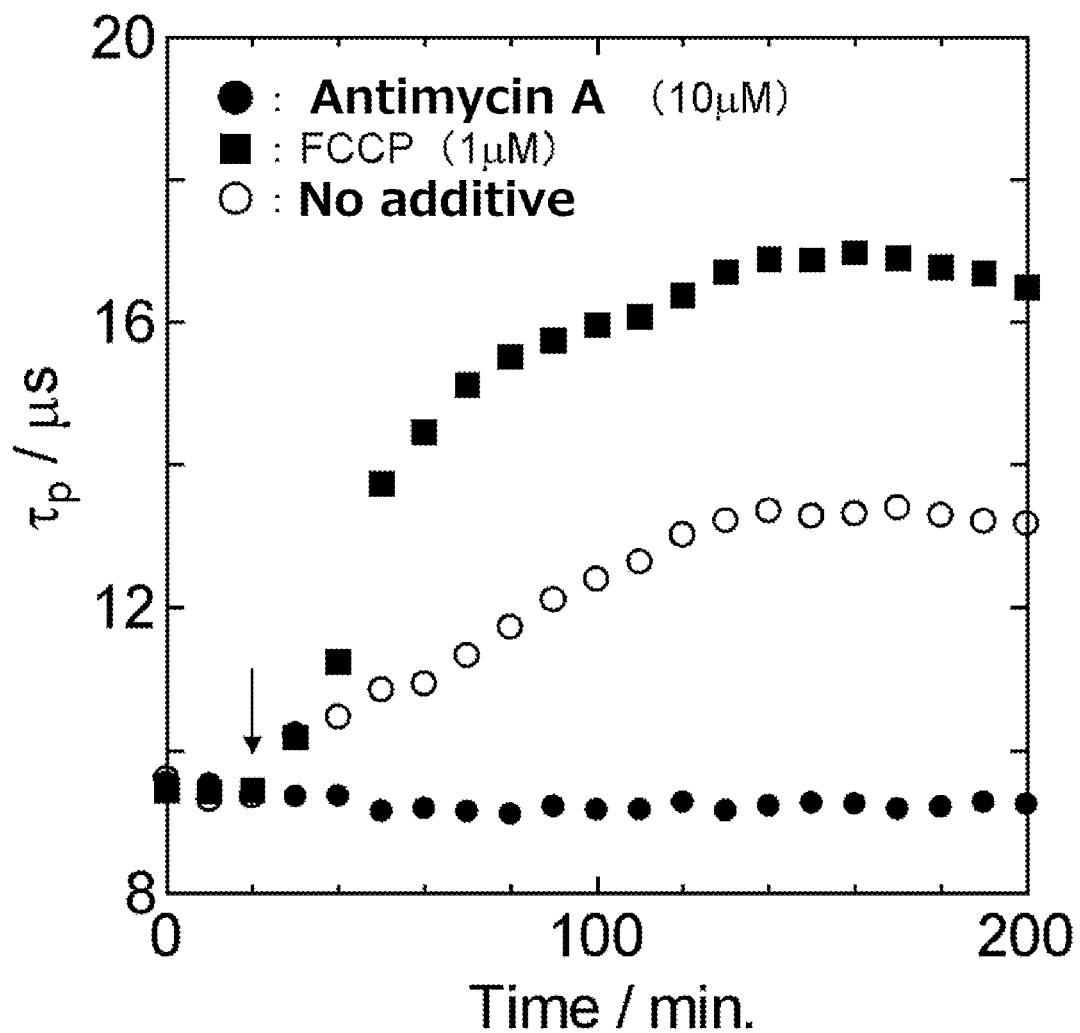
FIG. 6 shows changes in the phosphorescence lifetime of C6-BEDA incorporated in HT-29 cells. In the figure, "→" represents the time when an additive was added.

Using a luminescence lifetime measurement mode of a commercially available plate reader, changes in the oxygen concentration in cells were traced. In a 96-well plate, HT-29 cells were plated at 50,000 cells/well, and cultured for 48 hours. Thereafter, C6-BEDA was added thereto to a final concentration of 500 nM, and culture was carried out for 2 hours. After washing away the iridium complex that had not incorporated into the cells, antimycin A (final concentration, 10 µM), which is a respiration inhibitor, or FCCP (final concentration, 1 µM), which is an uncoupler (respiration activator), was added to the cells. After sealing the plate with oil, the phosphorescence lifetime was measured using a plate reader (excitation wavelength, 480 nm; measurement wavelength, 600 nm; FIG. 6). The phosphorescence lifetime ($\tau_p$/µs) was calculated using the following equation.

$$\tau_p = 30/\ln(W1/W2)$$

Figure 7:
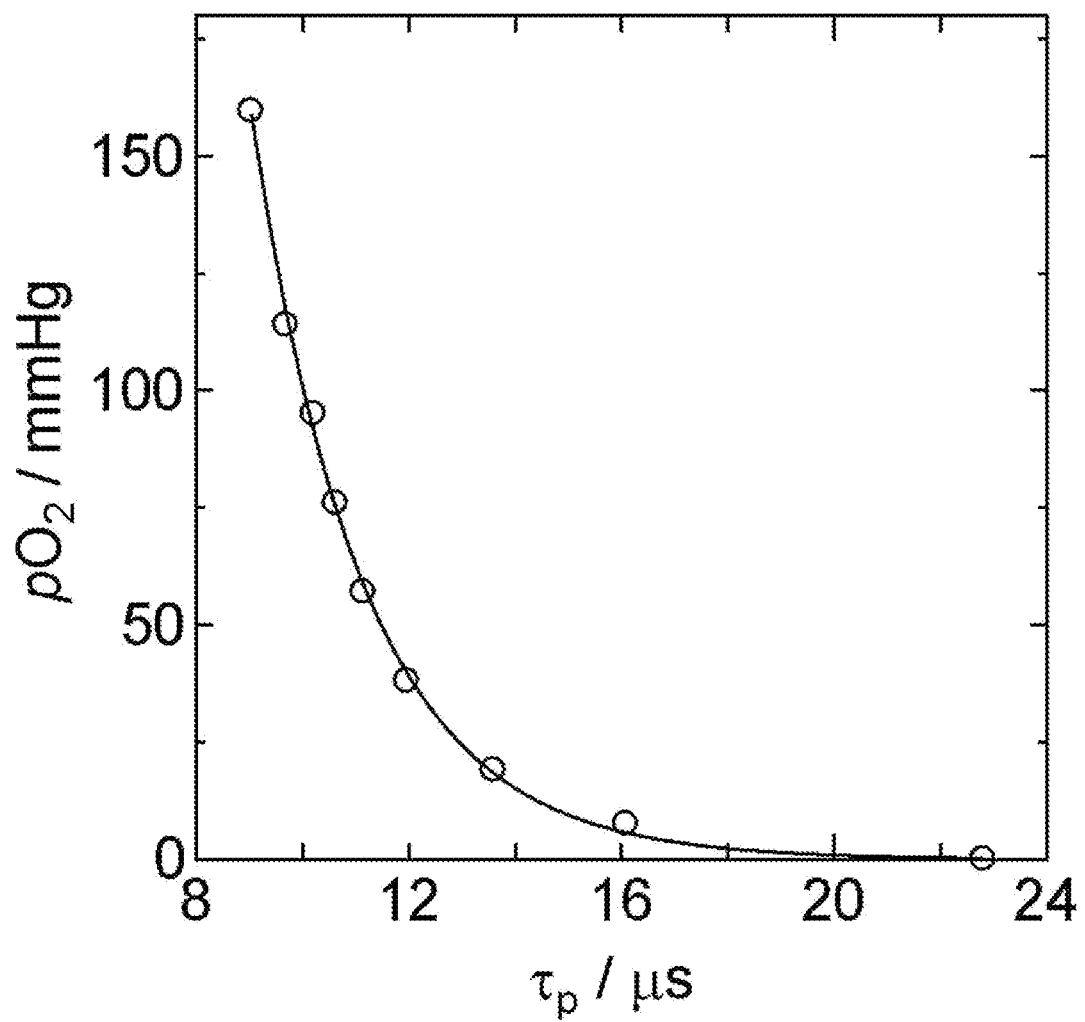
FIG. 7 shows changes in the phosphorescence lifetime and the culture oxygen partial pressure of C6-BEDA incorporated in HT-29 cells.
Figure 8:
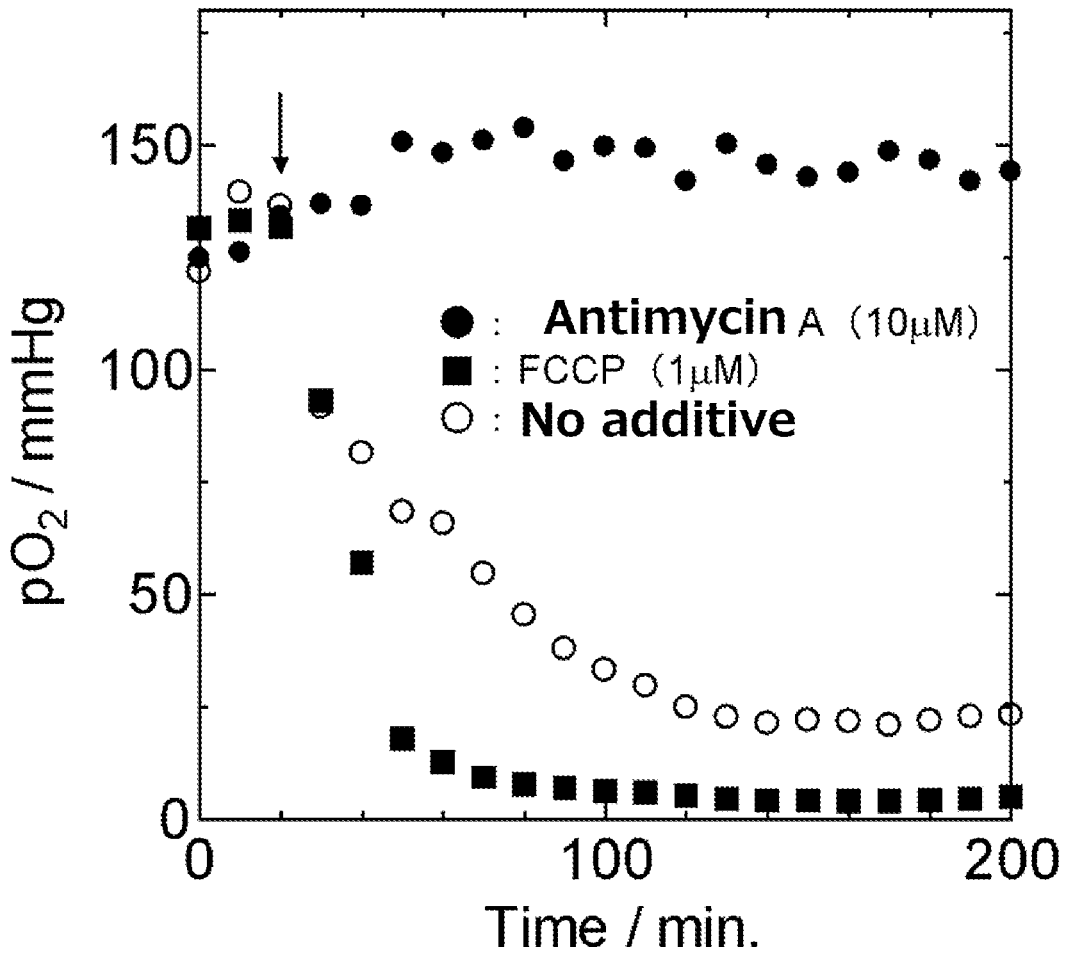
FIG. 8 shows changes in the oxygen partial pressure in HT-29 cells. In the figure, "→" represents the time when an additive was added.

Here, W1 and W2 are the integrated values of the phosphorescence intensity obtained during the periods of 10 to 30 µs and 40 to 60 µs after the pulse excitation. In the cells to which no additive was added, the phosphorescence lifetime increased with time. On the other hand, while the phosphorescence lifetime hardly changed in the cells to which antimycin A was added, the phosphorescence lifetime remarkably increased in the cells to which FCCP was added. This is due to the fact that intracellular oxygen consumption was stopped by the respiration inhibitory action of antimycin A, while intracellular oxygen consumption increased by the respiration-promoting action of FCCP. In order to convert the measured phosphorescence lifetime to the oxygen partial pressure, preparation of a calibration curve is necessary. Here, the calibration curve was prepared by measuring the phosphorescence lifetime at different oxygen partial pressures in the plate reader ($pO_2$=1521.03225 exp(-$\tau_p$/-2.10842)) (FIG. 7). The results of the conversion into the intracellular oxygen partial pressure using the calibration curve are shown in FIG. 8. The cells to which no additive was added showed a slow decrease in the oxygen partial pressure with time. In contrast, the cells to which FCCP was added showed a rapid decrease in the oxygen partial pressure. On the other hand, the cells to which antimycin A was added showed a slight increase in the oxygen partial pressure. Based on these results, it was found that the compounds represented by General Formula (I) or (II) including C6-BEDA are probe molecules capable of real-time tracing of changes in the intracellular oxygen concentration using a plate reader.

Example 3

Figure 9:
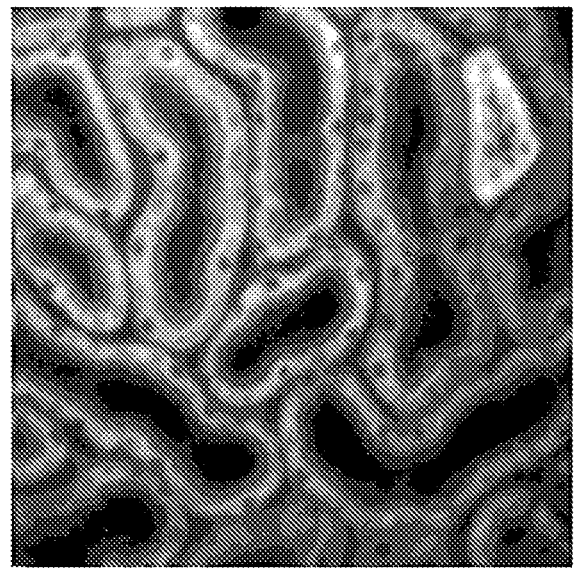
FIG. 9 shows a phosphorescence intensity image and a phosphorescence lifetime image (drawing-substituting photographs) of the surface of a kidney of a mouse to which C6-MEDA was administered.
Figure 9:
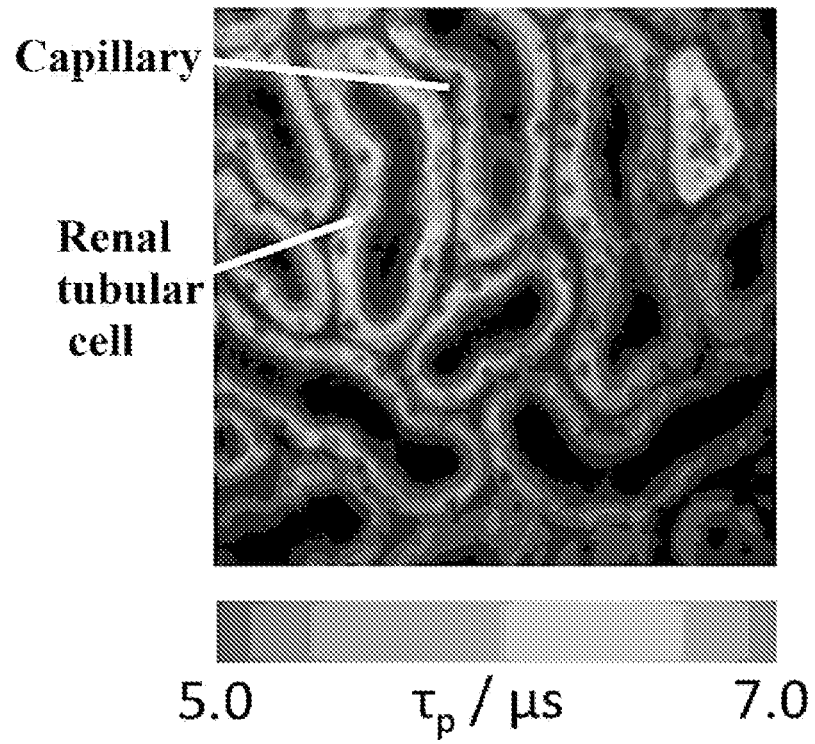
Figure 10:
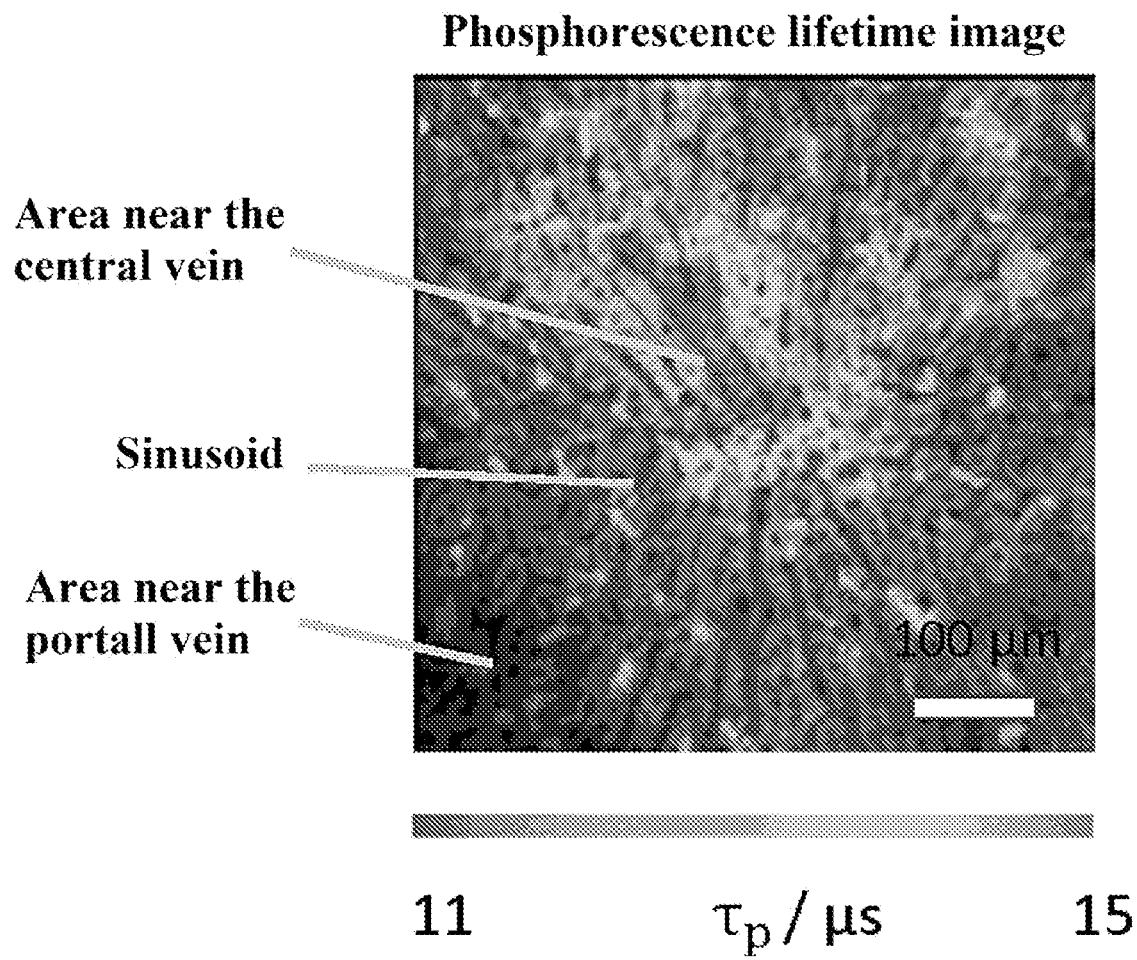
FIG. 10 shows a phosphorescence lifetime image (drawing-substituting photographs) of the surface of the liver of a mouse to which C6-BEDA was administered.
Figure 11:
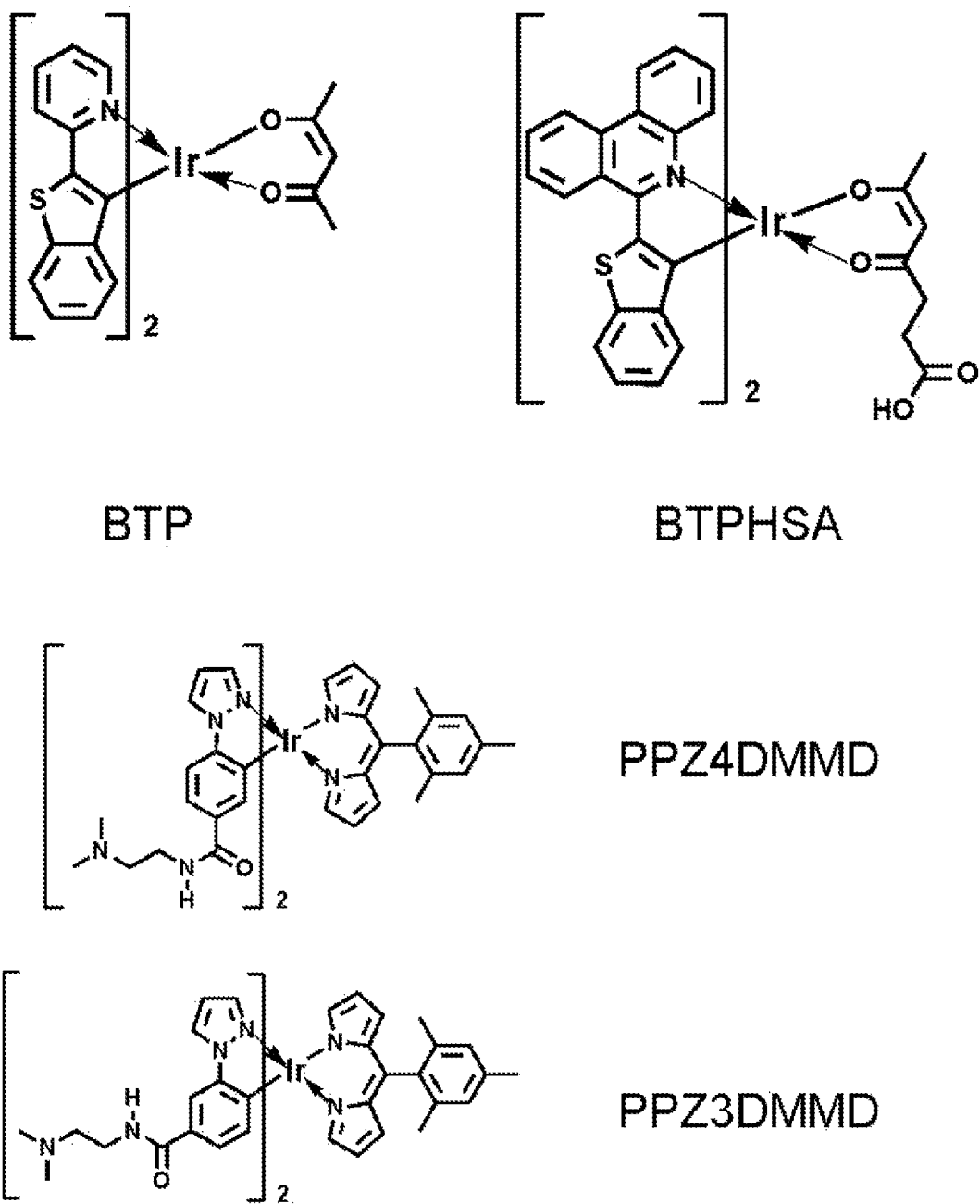
FIG. 11 shows the structural formulae of conventional phosphorescent reagents for measuring oxygen concentration.

Subsequently, the in vivo dynamics was evaluated. In the present experiment, a microscope capable of acquiring a phosphorescence lifetime image as well as a phosphorescence intensity image (PLIM: phosphorescence lifetime imaging microscope) was used. To the tail vein of a mouse under anesthesia, 250 µL of a solution of C6-MEDA or C6-BEDA (physiological saline:DMSO=9:1, v/v, 250 nmol) was administered to carry out a phosphorescence intensity imaging experiment and a phosphorescence lifetime imaging experiment (excitation wavelength, 488 nm; monitoring wavelength, 510 to 560 nm). FIG. 9 shows an imaging image of a kidney of the mouse to which C6-MEDA was administered. Renal tubular cells could be clearly imaged. It was also found from the phosphorescence lifetime imaging image that the phosphorescence lifetime varies among renal tubular cells, indicating that the variation may reflect differences in the oxygen partial pressure. FIG. 10 shows a lifetime imaging image of the liver of the mouse to which C6-BEDA was administered. The liver is composed of functional units called hepatic lobules. Arteries and portal veins are present in the periphery of hepatic lobules, and veins are present in the center. It has thus been pointed out that there is a gradient of the oxygen partial pressure from the periphery to the center. From the phosphorescence lifetime imaging image, the presence of the gradient of the phosphorescence lifetime can be seen. It can be seen that the area with a short lifetime (which is blue in the color image) corresponds to the periphery of hepatic lobules, and that the area with a long lifetime (which is orange in the color image) corresponds to the area near the central vein. From the above results, it was found that the compounds represented by General Formula (I) or (II) are capable of imaging of a low-oxygen-concentration tissue in a biological tissue.

Based on these results, the iridium complexes represented by General Formula (I) or (II) are novel reagents capable of measurement of the oxygen concentration in a cell or a living individual, and capable of imaging based on the oxygen concentration.

INDUSTRIAL APPLICABILITY

The present invention can be used as a reagent for measurement of the oxygen concentration in a biological sample or a living individual, and for imaging based on the oxygen concentration.

The invention claimed is:
1. A method for measuring oxygen concentration, the method comprising administering a compound represented by Formula (I) or (II) to a subject, monitoring a phosphorescence signal of the administered compound, and calculating oxygen concentration from the monitored phosphorescence intensity:

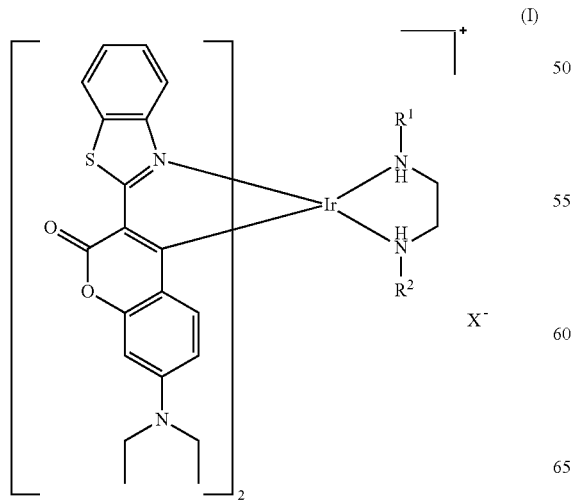

(I)

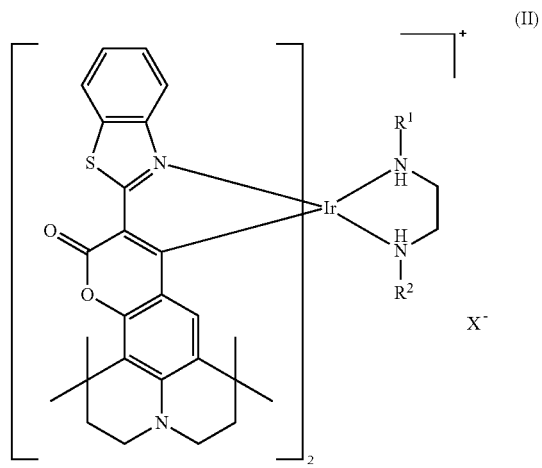

(II)

wherein
in Formula (II), $R^1$ and $R^2$ each independently represent hydrogen or a $C_1$-$C_6$ hydrocarbon group;
in Formula (I), $R^1$ and $R^2$ each independently represent a $C_2$-$C_6$ hydrocarbon group; and
$X^-$ represents a counter anion.

2. The method for measuring oxygen concentration according to claim 1, wherein $R^1$ is the same as $R^2$ in each Formula.

3. The method for measuring oxygen concentration according to claim 1, wherein $X^-$ is $PF_6^-$ or $Cl^-$.

4. The method for measuring oxygen concentration according to claim 1, wherein the compound is any one of:

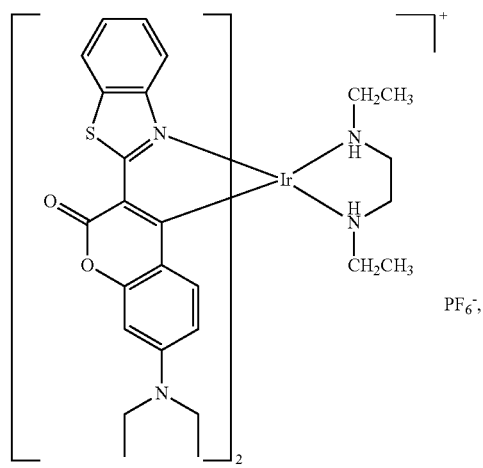

-continued

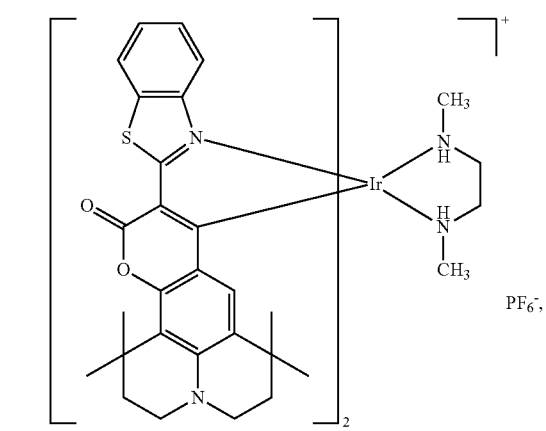

PF₆⁻,

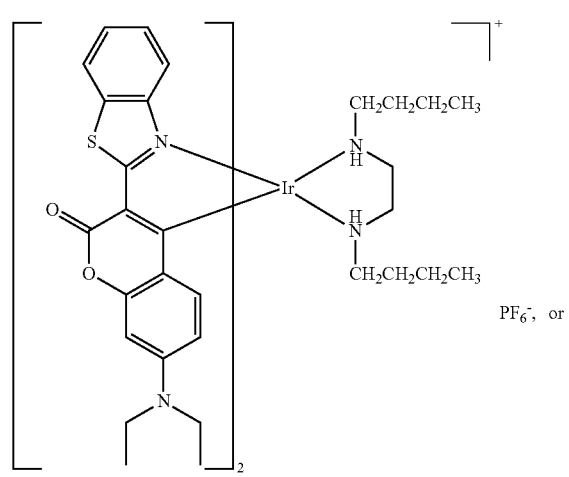

PF₆⁻, or

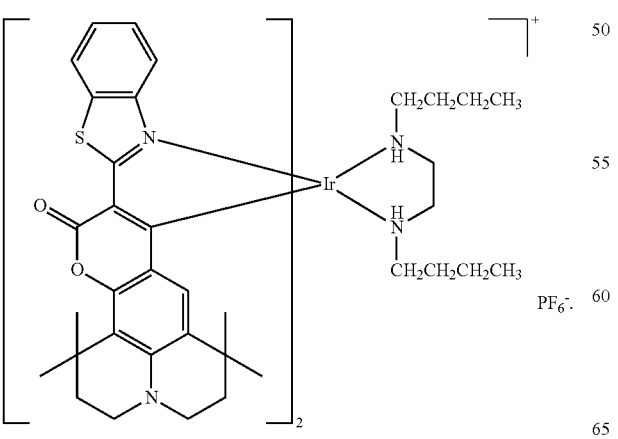

PF₆⁻.

5. A method for cancer diagnosis, the method comprising administering a compound represented by Formula (I) or (II) to a subject, monitoring a phosphorescence signal of the administered compound, and detecting as a cancer tissue, a site where an oxygen concentration is decreased relative to an oxygen concentration of normal tissues, from the monitored phosphorescence intensity:

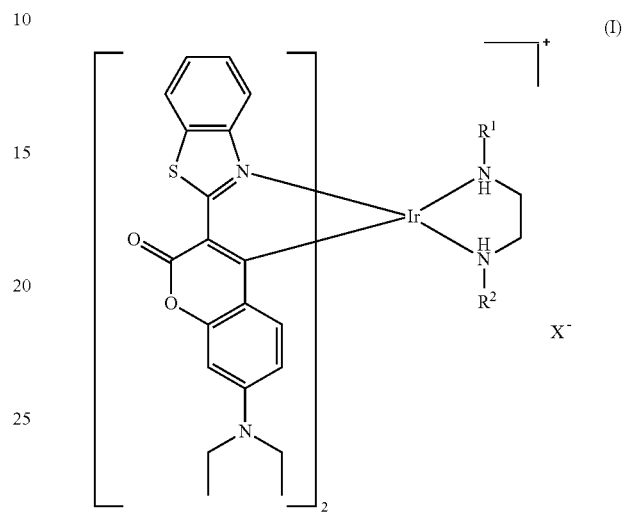

(I)

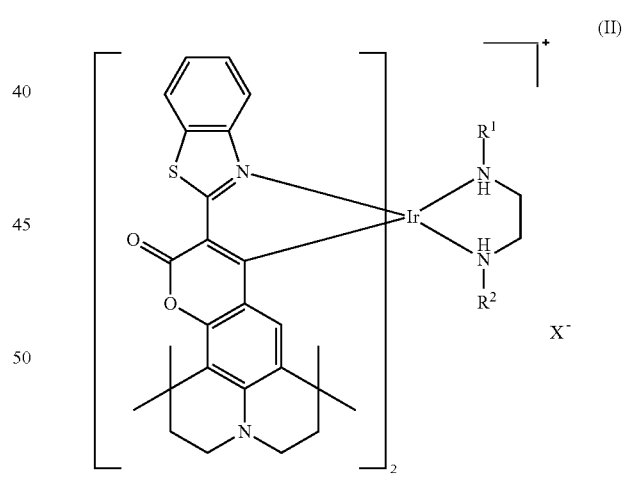

(II)

wherein
in Formula (II), $R^1$ and $R^2$ each independently represent hydrogen or a $C_1$-$C_6$ hydrocarbon group;
in Formula (I), $R^1$ and $R^2$ each independently represent a $C_2$-$C_6$ hydrocarbon group; and
$X^-$ represents a counter anion.

6. A compound represented by Formula (I)' or (II):

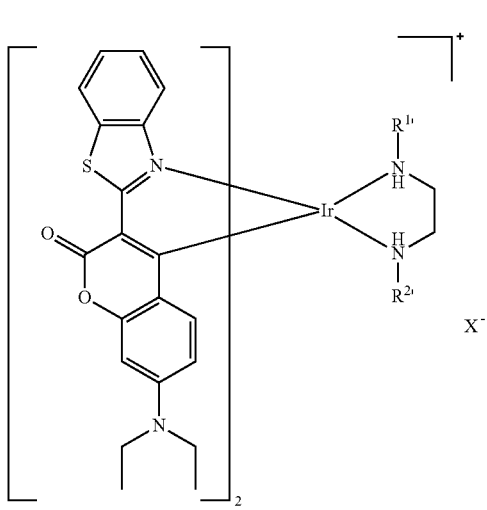

(I)'

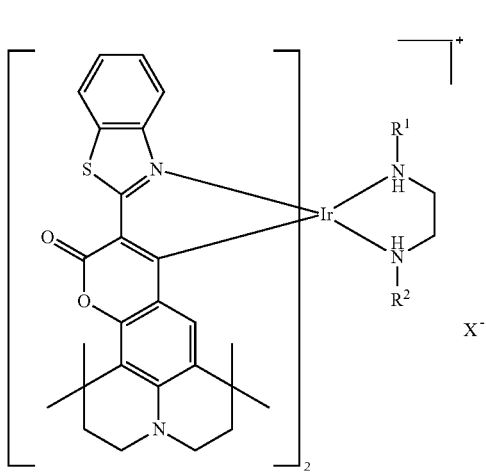

(II)

wherein
- $R^1$ and $R^2$ each independently represent hydrogen or a $C_1$-$C_6$ hydrocarbon group;
- $R^{1'}$ and $R^{2'}$ each independently represent a $C_2$-$C_6$ hydrocarbon group; and
- $X^-$ represents a counter anion.

7. The compound according to claim 6, wherein $R^1$ is the same as $R^2$ and $R^{1'}$ is the same as $R^{2'}$ in each Formula.

8. The compound according to claim 6, wherein $X^-$ is $PF_6^-$ or $Cl^-$.

9. The compound according to claim 8, which is any one of

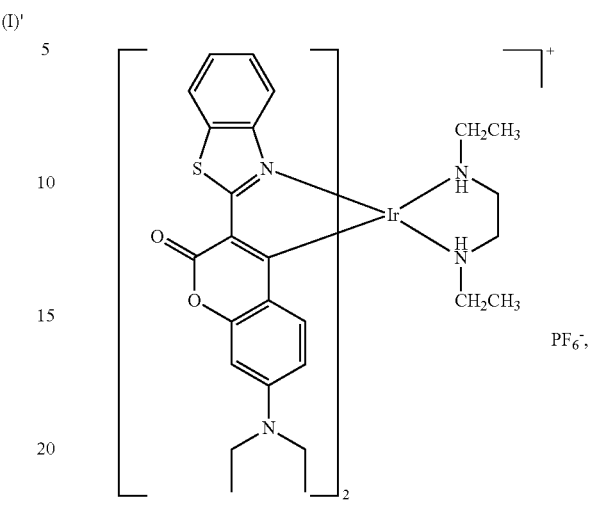

$PF_6^-$,

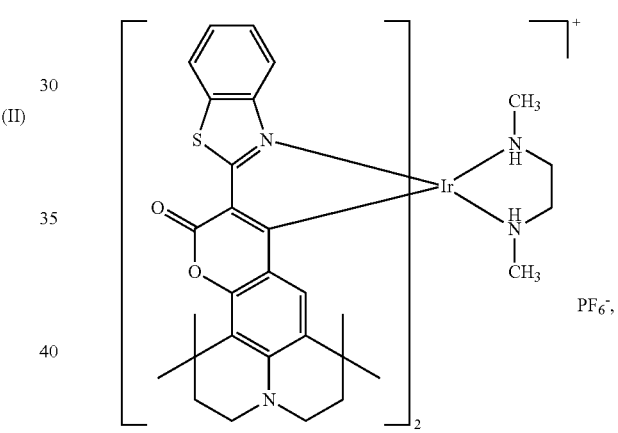

$PF_6^-$,

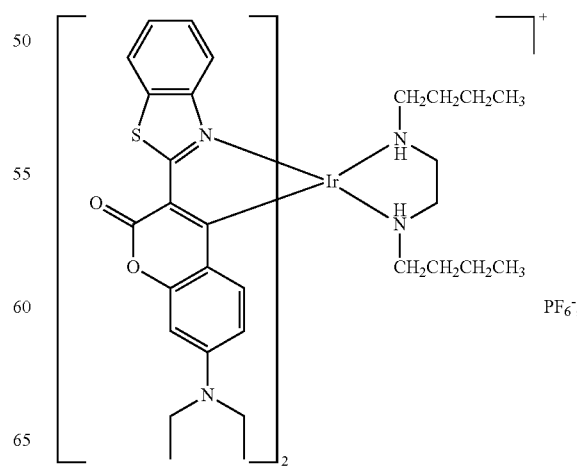

$PF_6^-$, or

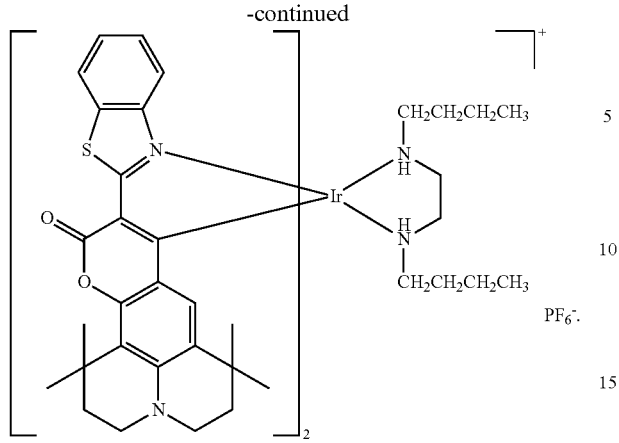
10. The method for measuring oxygen concentration according to claim 1, wherein the subject is selected from a cell, tissue and living individual.
* * * * *